United States Patent
Colgrove et al.

(10) Patent No.: US 11,100,174 B2
(45) Date of Patent: *Aug. 24, 2021

(54) SIMPLE WEB SEARCH

(71) Applicant: Palantir Technologies, Inc., Palo Alto, CA (US)

(72) Inventors: Caitlin Colgrove, Palo Alto, CA (US); Gregory Martin, Oakland, CA (US); Javier Campanini, Mountain View, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/049,605

(22) Filed: Jul. 30, 2018

(65) Prior Publication Data

US 2019/0026368 A1  Jan. 24, 2019

Related U.S. Application Data

(63) Continuation of application No. 14/985,201, filed on Dec. 30, 2015, now Pat. No. 10,037,383, which is a
(Continued)

(51) Int. Cl.
*G06F 16/951* (2019.01)
*G06F 16/245* (2019.01)
(Continued)

(52) U.S. Cl.
CPC .......... *G06F 16/951* (2019.01); *G06F 16/245* (2019.01); *G06F 16/2425* (2019.01);
(Continued)

(58) Field of Classification Search
CPC .. G06F 16/951; G06F 16/2448; G06F 16/245; G06F 16/903; G06F 16/958; G06F 16/2425
(Continued)

(56) References Cited

U.S. PATENT DOCUMENTS

| 4,899,161 A | 2/1990 | Morin et al. |
| 4,958,305 A | 9/1990 | Piazza |

(Continued)

FOREIGN PATENT DOCUMENTS

| AU | 2012216622 | 5/2015 |
| AU | 2014201599 | 1/2018 |

(Continued)

OTHER PUBLICATIONS

IBM, "Determining Business Object Structure," IBM, 2004, 9 pages.

(Continued)

*Primary Examiner* — Dung K Chau
(74) *Attorney, Agent, or Firm* — Hickman Becker Bingham Ledesma LLP

(57) ABSTRACT

A system of one or more computing devices is utilized for, among other purposes, creating a template-driven search interface and conducting searches thereon. In an embodiment, the system comprises: a template repository; search templates in the template repository, the search templates comprising at least: field specification data that specify search interface fields for obtaining search input data, and query specification data that specify how to generate structured queries based on the search input data obtained for the one or more of the search interface fields; a search field generator that generates search fields indicated by the field specification data; a template loading module, coupled to the template repository, that identifies available search templates in the template repository; and a search interface generator, coupled to the search field generator and template loading module, that generates different search interfaces depending on which template is selected.

20 Claims, 4 Drawing Sheets

Related U.S. Application Data continuation of application No. 14/487,342, filed on Sep. 16, 2014, now Pat. No. 9,262,529, which is a continuation of application No. 14/077,159, filed on Nov. 11, 2013, now Pat. No. 8,868,537.

(51) Int. Cl.
  *G06F 16/903* (2019.01)
  *G06F 16/958* (2019.01)
  *G06F 16/242* (2019.01)

(52) U.S. Cl.
  CPC ........ *G06F 16/2448* (2019.01); *G06F 16/903* (2019.01); *G06F 16/958* (2019.01)

(58) Field of Classification Search
  USPC .. 707/706, 722, 737, 769, 999.003, 999.004
  See application file for complete search history.

(56) References Cited

U.S. PATENT DOCUMENTS

| | | |
|---|---|---|
| 5,021,792 A | 6/1991 | Hwang |
| 5,109,399 A | 4/1992 | Thompson |
| 5,329,108 A | 7/1994 | Lamoure |
| 5,555,503 A | 9/1996 | Kyrtsos et al. |
| 5,631,981 A | 5/1997 | Rao |
| 5,632,009 A | 5/1997 | Rao et al. |
| 5,670,987 A | 9/1997 | Doi et al. |
| 5,754,182 A | 5/1998 | Kobayashi |
| 5,781,195 A | 7/1998 | Marvin |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,141,659 A | 10/2000 | Barker et al. |
| 6,157,747 A | 12/2000 | Szeliski et al. |
| 6,161,098 A | 12/2000 | Wallman |
| 6,173,067 B1 | 1/2001 | Payton et al. |
| 6,178,432 B1 | 1/2001 | Cook et al. |
| 6,189,003 B1 | 2/2001 | Leal |
| 6,219,053 B1 | 4/2001 | Tachibana et al. |
| 6,232,971 B1 | 5/2001 | Haynes |
| 6,247,019 B1 | 6/2001 | Davies |
| 6,272,489 B1 | 8/2001 | Rauch et al. |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,389,289 B1 | 5/2002 | Voce et al. |
| 6,414,683 B1 | 7/2002 | Gueziec |
| 6,456,997 B1 | 9/2002 | Shukla |
| 6,483,509 B1 | 11/2002 | Rabenhorst |
| 6,529,900 B1 | 3/2003 | Patterson et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,662,103 B1 | 12/2003 | Skolnick et al. |
| 6,674,434 B1 | 1/2004 | Chojnacki et al. |
| 6,714,936 B1 | 3/2004 | Nevin, III |
| 6,757,445 B1 | 6/2004 | Knopp |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,113,964 B1 | 9/2006 | Bequet et al. |
| 7,139,800 B2 | 11/2006 | Bellotti et al. |
| 7,158,797 B1 | 1/2007 | Jayaraman et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,188,100 B2 | 3/2007 | De Bellis et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Caballero et al. |
| 7,383,053 B2 | 6/2008 | Kent et al. |
| 7,426,654 B2 | 9/2008 | Adams et al. |
| 7,441,182 B2 | 10/2008 | Beilinson et al. |
| 7,454,466 B2 | 11/2008 | Bellotti et al. |
| 7,457,706 B2 | 11/2008 | Malero et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,523,100 B1 | 4/2009 | Bionda et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,533,008 B2 | 5/2009 | Mangino |
| 7,539,666 B2 | 5/2009 | Ashworth et al. |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,652,622 B2 | 1/2010 | Hansen et al. |
| 7,663,621 B1 | 2/2010 | Allen et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,747,648 B1 | 6/2010 | Kraft et al. |
| 7,760,969 B2 | 7/2010 | Silverbrook et al. |
| 7,770,100 B2 | 8/2010 | Chamberlain et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,870,493 B2 | 1/2011 | Pall et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,945,470 B1 | 5/2011 | Cohen et al. |
| 7,945,852 B1 | 5/2011 | Pilskains |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,971,784 B2 | 7/2011 | Lapstun |
| 8,001,465 B2 | 8/2011 | Kudrolli et al. |
| 8,001,482 B2 | 8/2011 | Bhattiprolu et al. |

(56) References Cited

U.S. PATENT DOCUMENTS

| | | |
|---|---|---|
| 8,010,545 B2 | 8/2011 | Stefik et al. |
| 8,015,487 B2 | 9/2011 | Roy et al. |
| 8,024,778 B2 | 9/2011 | Cash et al. |
| 8,028,894 B2 | 10/2011 | Lapstun et al. |
| 8,036,632 B1 | 10/2011 | Cona et al. |
| 8,042,110 B1 | 10/2011 | Kawahara et al. |
| 8,065,080 B2 | 11/2011 | Koch |
| 8,085,268 B2 | 12/2011 | Carrino et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,285,725 B2 | 10/2012 | Bayliss |
| 8,290,926 B2 | 10/2012 | Ozzie et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,402,047 B1 | 3/2013 | Mangini et al. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,477,994 B1 | 7/2013 | Noshadi |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,521,135 B2 | 8/2013 | Cryderman |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,069 B1 | 4/2014 | Cazanas et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,059 B2 | 5/2014 | Rabenold et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,762,870 B2 | 6/2014 | Robotham et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,849,254 B2 | 9/2014 | Bolon |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,037,407 B2 | 5/2015 | Thompson |
| 9,043,696 B1 | 5/2015 | Meiklejohn et al. |
| 9,043,894 B1 | 5/2015 | Dennison et al. |
| 9,104,695 B1 | 8/2015 | Cervelli et al. |
| 9,111,380 B2 | 8/2015 | Piemonte et al. |
| 9,116,975 B2 | 8/2015 | Shankar et al. |
| 9,123,086 B1 | 9/2015 | Freeland et al. |
| 9,262,529 B2 | 2/2016 | Colgrove et al. |
| 9,275,069 B1 | 3/2016 | Garrod et al. |
| 9,301,103 B1 | 3/2016 | Thompson |
| 9,313,233 B2 | 4/2016 | Sprague et al. |
| 9,380,431 B1 | 6/2016 | Freeland et al. |
| 9,674,662 B2 | 6/2017 | Freeland et al. |
| 9,727,376 B1 | 8/2017 | Bills et al. |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130867 A1 | 9/2002 | Yang et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0052896 A1 | 3/2003 | Higgins et al. |
| 2003/0061211 A1 | 3/2003 | Shultz et al. |
| 2003/0103049 A1 | 6/2003 | Kindratenko et al. |
| 2003/0140106 A1 | 7/2003 | Raguseo |
| 2003/0144868 A1 | 7/2003 | MacIntyre et al. |
| 2003/0152277 A1 | 8/2003 | Hall et al. |
| 2003/0163352 A1 | 8/2003 | Surpin et al. |
| 2003/0225755 A1 | 12/2003 | Iwayama et al. |
| 2003/0227746 A1 | 12/2003 | Sato |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0039498 A1 | 2/2004 | Ollis et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0103124 A1 | 5/2004 | Kupkova |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | McPherson et al. |
| 2004/0193600 A1 | 9/2004 | Kaasten et al. |
| 2004/0203380 A1 | 10/2004 | Hamdi et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125436 A1 | 6/2005 | Mudunuri et al. |

(56) References Cited

U.S. PATENT DOCUMENTS

| | | |
|---|---|---|
| 2005/0125715 A1 | 6/2005 | Franco et al. |
| 2005/0143096 A1 | 6/2005 | Boesch |
| 2005/0143602 A1 | 6/2005 | Yada et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1 | 2/2006 | Kreitler et al. |
| 2006/0053096 A1 | 3/2006 | Subramanian et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0146050 A1 | 7/2006 | Yamauchi |
| 2006/0149596 A1 | 7/2006 | Surpin et al. |
| 2006/0161568 A1 | 7/2006 | Dettinger et al. |
| 2006/0203337 A1 | 9/2006 | White |
| 2006/0206235 A1 | 9/2006 | Shakes et al. |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0250764 A1 | 11/2006 | Howarth et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043744 A1 | 2/2007 | Carro |
| 2007/0057966 A1 | 3/2007 | Ohno et al. |
| 2007/0072591 A1 | 3/2007 | McGary et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0115373 A1 | 5/2007 | Gallagher et al. |
| 2007/0118547 A1 | 5/2007 | Gupta et al. |
| 2007/0130541 A1 | 6/2007 | Louch et al. |
| 2007/0150369 A1 | 6/2007 | Zivin |
| 2007/0150520 A1 | 6/2007 | Bennett et al. |
| 2007/0174760 A1 | 7/2007 | Chamberlain et al. |
| 2007/0188516 A1 | 8/2007 | Loup et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0250491 A1 | 10/2007 | Olszak et al. |
| 2007/0258642 A1 | 11/2007 | Thota |
| 2007/0266336 A1 | 11/2007 | Nojima et al. |
| 2007/0294643 A1 | 12/2007 | Kyle |
| 2008/0007618 A1 | 1/2008 | Yuasa |
| 2008/0010605 A1 | 1/2008 | Frank |
| 2008/0025629 A1 | 1/2008 | Obrador et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0163073 A1 | 7/2008 | Becker et al. |
| 2008/0164998 A1 | 7/2008 | Scherpbier et al. |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0223834 A1 | 9/2008 | Griffiths et al. |
| 2008/0227473 A1 | 9/2008 | Haney |
| 2008/0229056 A1 | 9/2008 | Agarwal et al. |
| 2008/0252419 A1 | 10/2008 | Batchelor et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301559 A1 | 12/2008 | Martinsen et al. |
| 2008/0301643 A1 | 12/2008 | Appleton et al. |
| 2008/0313281 A1 | 12/2008 | Scheidl et al. |
| 2009/0002492 A1 | 1/2009 | Velipasalar et al. |
| 2009/0005070 A1 | 1/2009 | Forstall et al. |
| 2009/0006471 A1 | 1/2009 | Richardson et al. |
| 2009/0006474 A1 | 1/2009 | Richardson et al. |
| 2009/0027418 A1 | 1/2009 | Maru et al. |
| 2009/0030915 A1 | 1/2009 | Winter et al. |
| 2009/0037912 A1 | 2/2009 | Stoitsev et al. |
| 2009/0055251 A1 | 2/2009 | Shah et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0119309 A1 | 5/2009 | Gibson et al. |
| 2009/0119578 A1 | 5/2009 | Relyea et al. |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138790 A1 | 5/2009 | Larcheveque et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0156231 A1 | 6/2009 | Versteeg et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0265105 A1 | 10/2009 | Davis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0315679 A1 | 12/2009 | Bauchot et al. |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0058212 A1 | 3/2010 | Belitz et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |

(56) References Cited

U.S. PATENT DOCUMENTS

| | | |
|---|---|---|
| 2010/0076968 A1 | 3/2010 | Boyns et al. |
| 2010/0082842 A1 | 4/2010 | Lavrov et al. |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114817 A1 | 5/2010 | Broeder et al. |
| 2010/0114887 A1 | 5/2010 | Conway et al. |
| 2010/0121817 A1 | 5/2010 | Meyer et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0173619 A1 | 7/2010 | Hua et al. |
| 2010/0185984 A1 | 7/2010 | Wright et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0214117 A1 | 8/2010 | Hazzani |
| 2010/0223543 A1 | 9/2010 | Marston |
| 2010/0228812 A1 | 9/2010 | Uomini |
| 2010/0250412 A1 | 9/2010 | Wagner |
| 2010/0277611 A1 | 11/2010 | Holt et al. |
| 2010/0280857 A1 | 11/2010 | Liu et al. |
| 2010/0281458 A1 | 11/2010 | Paladino et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0022312 A1 | 1/2011 | McDonough et al. |
| 2011/0029526 A1 | 2/2011 | Knight et al. |
| 2011/0047159 A1 | 2/2011 | Baid et al. |
| 2011/0060753 A1 | 3/2011 | Shaked |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0093440 A1 | 4/2011 | Asakura et al. |
| 2011/0111786 A1 | 5/2011 | Rao |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0158469 A1 | 6/2011 | Mastykarz |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0202557 A1 | 8/2011 | Atsmon et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0276423 A1 | 11/2011 | Davidson |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0010812 A1 | 1/2012 | Thompson |
| 2012/0014560 A1 | 1/2012 | Obrador et al. |
| 2012/0015673 A1 | 1/2012 | Klassen et al. |
| 2012/0019559 A1 | 1/2012 | Siler et al. |
| 2012/0032975 A1 | 2/2012 | Koch |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0150578 A1 | 6/2012 | Mangat et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0166929 A1 | 6/2012 | Henderson et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0216106 A1 | 8/2012 | Casey |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0268269 A1 | 10/2012 | Doyle |
| 2012/0277914 A1 | 11/2012 | Crow et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0317202 A1 | 12/2012 | Lewis |
| 2012/0323888 A1 | 12/2012 | Osann, Jr. |
| 2012/0330973 A1 | 12/2012 | Ghuneim et al. |
| 2013/0005362 A1 | 1/2013 | Borghei |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013642 A1 | 1/2013 | Klein et al. |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0143597 A1 | 6/2013 | Mitsuya et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0165069 A1 | 6/2013 | Nitta et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0196614 A1 | 8/2013 | Pahlevani |
| 2013/0224696 A1 | 8/2013 | Wolfe et al. |
| 2013/0225212 A1 | 8/2013 | Khan |

(56) References Cited

U.S. PATENT DOCUMENTS

| | | |
|---|---|---|
| 2013/0226318 A1 | 8/2013 | Procyk |
| 2013/0226953 A1 | 8/2013 | Markovich et al. |
| 2013/0232045 A1 | 9/2013 | Tai |
| 2013/0235749 A1 | 9/2013 | Cho et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262171 A1 | 10/2013 | Solodko et al. |
| 2013/0262497 A1 | 10/2013 | Case et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0295970 A1 | 11/2013 | Sheshadri et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0079340 A1 | 3/2014 | Kawano |
| 2014/0081685 A1 | 3/2014 | Thacker et al. |
| 2014/0093174 A1 | 4/2014 | Zhang et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0258827 A1 | 9/2014 | Gormish et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0302783 A1 | 10/2014 | Aiuto et al. |
| 2014/0304582 A1 | 10/2014 | Bills et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0357299 A1 | 12/2014 | Xu et al. |
| 2014/0358252 A1 | 12/2014 | Ellsworth et al. |
| 2014/0361899 A1 | 12/2014 | Layson |
| 2015/0005014 A1 | 1/2015 | Huang et al. |
| 2015/0019394 A1 | 1/2015 | Unser et al. |
| 2015/0029176 A1 | 1/2015 | Baxter et al. |
| 2015/0046870 A1 | 2/2015 | Goldenberg et al. |
| 2015/0080012 A1 | 3/2015 | Sprague et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134633 A1 | 5/2015 | Colgrove et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0227295 A1 | 8/2015 | Meiklejohn et al. |
| 2015/0331919 A1 | 11/2015 | Freeland et al. |
| 2016/0110458 A1 | 4/2016 | Colgrove et al. |
| 2017/0132200 A1 | 5/2017 | Noland et al. |
| 2017/0257743 A1 | 9/2017 | Freeland et al. |
| 2017/0308402 A1 | 10/2017 | Bills et al. |
| 2018/0084383 A1 | 3/2018 | Freeland |

FOREIGN PATENT DOCUMENTS

| | | |
|---|---|---|
| DE | 102014103482 | 9/2014 |
| DE | 102013222023 | 1/2015 |
| DE | 102014215621 | 2/2015 |
| EP | 0 763 201 | 3/1997 |
| EP | 1 672 527 | 6/2006 |
| EP | 2400448 | 12/2011 |
| EP | 2551799 | 1/2013 |
| EP | 2560134 | 2/2013 |
| EP | 2 575 107 | 4/2013 |
| EP | 2778977 | 9/2014 |
| EP | 2816513 | 12/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2916276 | 9/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2002/065353 | 8/2002 |
| WO | WO 2004/038548 | 5/2004 |
| WO | WO 2004/057268 | 7/2004 |
| WO | WO 2005/013200 | 2/2005 |
| WO | WO 2005/104736 | 11/2005 |
| WO | WO 2008/064207 | 5/2008 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2011/058507 | 5/2011 |
| WO | WO 2013/010157 | 1/2013 |
| WO | WO 2013/102892 | 7/2013 |

OTHER PUBLICATIONS

Official Communication for New Zealand Patent Application No. 622501 dated Apr. 1, 2014.

Official Communication for New Zealand Patent Application No. 622501 dated Jun. 5, 2014.

Official Communication for European Patent Application No. 14159447.3 dated Nov. 25, 2014.

(56) References Cited

OTHER PUBLICATIONS

Official Communication for European Patent Application No. 14159447.3 dated Jan. 8, 2015.
Official Communication for European Patent Application No. 15157642.8 dated Jul. 20, 2015.
European Patent Office, "Search Report" in application No. 14189802.3-1954, dated May 11, 2015, 8 pages.
European Claims in application No. 14189802.3-1954, dated May 2015, 5 pages.
Li et al., "Interactive Multimodal Visual Search on Mobile Device", IEEE Transactions on Multimedia, vol. 15, No. 3, dated Apr. 2013, 14 pages.
Umagandhi et al., "Search Query Recommendations Using Hybrid User Profile with Query Logs" International Journal of Computer Applications, vol. 80, No. 10, dated Oct. 2013, 12 pages.
Woodbridge, Stephen, "[geos-devel] Polygon simplification," <http://lists.osgeo.org/pipermail/geos-devel/2011-May/005210.html> dated May 8, 2011, pp. 3.
New Zealand Intellectual Property Office, "First Examination Report" in application No. 35215130/AJS, dated Apr. 1, 2014, 2 pages.
Barnes et al., "Viewshed Analysis", GIS-ARC/INFO 2001, <www.evsc.virginia.edu/~jhp7e/evsc466/student_pres/Rounds.pdf>.
Official Communication for Netherlands Patent Application No. 2012778 dated Sep. 22, 2015.
Wikipedia, "Douglas_Peucker-Algorithms," <http://de.wikipedia.org/w/index.php?title=Douglas-Peucker-Algorithmus&oldid=91846042> printed Jul. 2011, pp. 2.
Map of San Jose, CA. Retrieved Oct. 2, 2013 from http://maps.google.com.
Official Communication for European Patent Application No. 14187739.9 dated Jul. 6, 2015.
Official Communication for European Application No. 14159447.3 dated Sep. 28, 2016.
Qiu, Fang, "3d Analysis and Surface Modeling", <http://web.archive.ordweb/20091202221925/http://www.utsa.edu/lrsg/Teaching/EES6513/08-3D.pdf> printed Sep. 16, 2013 in 26 pages.
Ipbucker, C., "Inverse Transformation for Several Pseudo-cylindrical Map Projections Using Jacobian Matrix," ICCSA 2009, Part 1 LNCS 5592, pp. 553-564.
Wongsuphasawat et al., "Visual Analytics for Transportation Incident Data Sets," Transportation Research Record 2138, 2009, pp. 135-145.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Reibel, M., "Geographic Information Systems and Spatial Data Processing in Demography: a Review," Population Research and Policy Review, 2007, vol. 26, pp. 601-618.
Mandagere, Nagapramod, "Buffer Operations in GIS," <http://www-users.cs.umn.edu/~npramod/enc_pdf.pdf> retrieved Jan. 28, 2010, pp. 7.
Map of San Jose, CA. Retrieved Oct. 2, 2013 from http://maps.yahoo.com.
Open Street Map, "Amm's Diary:Unconnected ways and other data quality issues," http://www.openstreetmap.org/user/amm/diary printed Jul. 23, 2012 in 3 pages.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Stack Overflow, How to use update trigger to update another table, May 2012, 2 pages.
Official Communication for New Zealand Patent Application No. 622513 dated Apr. 3, 2014.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Notice of Acceptance for Australian Patent Application No. 2012216622 dated Jan. 6, 2015.
Official Communication for European Patent Application No. 14159464.8 dated Aug. 20, 2014.

Snyder, "Map Projections—A Working Manual," U.S. Geological Survey Professional paper 1395, United States Government Printing Office, Washington: 1987, pp. 11-21 and 60-70.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
Levine, N., "Crime Mapping and the Crimestat Program," Geographical Analysis, 2006, vol. 38, pp. 41-56.
European Patent Office, "Search Report" in application No. 14 189 802.3-1224, dated Mar. 21, 2018, 4 pages.
European Claims in application No. 14 189 202.3-1224, dated Mar. 2018, 5 pages.
Map of San Jose, CA. Retrieved Oct. 2, 2013 from http://maps.bing.com.
Valentini et al., "Ensembles of Learning Machines", M. Marinaro and R. Tagliaferri (Eds.): WIRN VIETRI 2002, LNCS 2486, pp. 3-20.
VB Forums, "Buffer a Polygon," Internet Citation, <http://www.vbforums.com/showthread.php?198436-Buffer-a-Polygon>, Specifically Thread #1, #5 & #11 retrieved on May 2, 2013, pp. 8.
Official Communication for European Patent Application No. 15157642.8 dated Apr. 13, 2017.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.
POI Editor, "How to: Create Your Own Points of Interest," <http://www.poieditor.com/articles/how_to_create_your_own_points_of_interest/> printed Jul. 22, 2012 in 4 pages.
Vivid Solutions, "JTS Topology Suite: Technical Specifications," <http://www.vividsolutions.com/jts/bin/JTS%20Technical%20Specs.pdf> Version 1.4, 2003, pp. 36.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Haralick et al., "Image Analysis Using Mathematical Morphology," Pattern Analysis and Machine Intelligence, IEEE Transactions, Jul. 1987, vol. PAMI-9, No. 4, pp. 532-550.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Gorr et al., "Crime Hot Spot Forecasting: Modeling and Comparative Evaluation", Grant 98-IJ-CX-K005, May 6, 2002, 37 pages.
Tangelder et al., "Freeform Shape Matching Using Minkowski Operations," The Netherlands, Jun. 1996, pp. 12.
Reibel et al., "Areal Interpolation of Population Counts Using Pre-classi_ed Land Cover Data," Population Research and Policy Review, 2007, vol. 26, pp. 619-633.
Official Communication for European Patent Application No. 14180321.3 dated Apr. 17, 2015.
Official Communication for Australian Patent Application No. 2014201511 dated Feb. 27, 2015.
Official Commuincation for Australian Patent Application No. 2014202442 dated Mar. 19, 2015.
Official Communication for Great Britain Patent Application No. 1404457.2 dated Aug. 14, 2014.

(56) References Cited

OTHER PUBLICATIONS

Hansen et al., "Analyzing Social Media Networks with NodeXL: Insights from a Connected World", Chapter 4, pp. 53-67 and Chapter 10, pp. 143-164, published Sep. 2010.
Official Communication for New Zealand Patent Application No. 628263 dated Aug. 12, 2014.
Gesher, Ari, "Palantir Screenshots in the Wild: Swing Sightings," The Palantir Blog, Sep. 11, 2007, pp. 1-12.
Official Communication for European Patent Application No. 15155846.7 dated Jul. 8, 2015.
Palmas et al., "An Edge-Bunding Layout for Interactive Parallel Coordinates" 2014 IEEE Pacific Visualization Symposium, pp. 57-64.
Manske, "File Saving Dialogs," <http://www.mozilla.org/editor/ui_specs/FileSaveDialogs.html>, Jan. 20, 1999, pp. 7.
Huang et al., "Systematic and Integrative Analysis of Large Gene Lists Using DAVID Bioinformatics Resources," Nature Protocols, 4.1, 2008, 44-57.
Definition "Identify", downloaded Jan. 22, 2015, 1 page.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for Netherlands Patent Application No. 2013306 dated Apr. 24, 2015.
Official Communication for European Patent Application No. 14197879.1 dated Apr. 28, 2015.
"A Quick Guide to UniProtKB Swiss-Prot & TrEMBL," Sep. 2011, pp. 2.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for European Patent Application No. 14187996.5 dated Feb. 12, 2015.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Yang et al., "HTML Page Analysis Based on Visual Cues", A129, pp. 859-864, 2001.
Li et al., "Interactive Multimodal Visual Search on Mobile Device," IEEE Transactions on Multimedia, vol. 15, No. 3, Apr. 1, 2013, pp. 594-607.
Official Communication for Australian Patent Application No. 2014210614 dated Jun. 5, 2015.
Official Communication for European Patent Application No. 14159464.8 dated Oct. 8, 2014.
Kitts, Paul, "Chapter 14: Genome Assembly and Annotation Process," The NCBI Handbook, Oct. 2002, pp. 1-21.
Official Communication for European Patent Application No. 14159464.8 dated Jul. 31, 2014.
Official Communication for Australian Patent Application No. 2014210604 dated Jun. 5, 2015.
Rouse, Margaret, "OLAP Cube," <http://searchdatamanagement.techtarget.com/definition/OLAP-cube>, Apr. 28, 2012, pp. 16.
Goswami, Gautam, "Quite Writly Said!," One Brick at a Time, Aug. 21, 2005, pp. 7.
Conner, Nancy, "Google Apps: The Missing Manual," May 1, 2008, pp. 15.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for New Zealand Patent Application No. 628840 dated Aug. 28, 2014.
Official Communication for Great Britain Patent Application No. 1413935.6 dated Jan. 27, 2015.
Official Communication for European Patent Application No. 14159464.8 dated Sep. 22, 2014.
Official Communication for Australian Patent Application No. 2014250678 dated Jun. 17, 2015.
Griffith, Daniel A., "A Generalized Huff Model," Geographical Analysis, Apr. 1982, vol. 14, No. 2, pp. 135-144.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for Australian Patent Application No. 2014213553 dated May 7, 2015.
Official Communication for New Zealand Patent Application No. 622513 dated Aug. 3, 2014.
Nierman, "Evaluating Structural Similarity in XML Documents", 6 pages, 2002.
Official Communication for European Patent Application No. 14191540.5 dated May 27, 2015.
Official Communication for European Patent Application No. 14186225.0 dated Feb. 13, 2015.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Official Communication for New Zealand Patent Application No. 627962 dated Aug. 5, 2014.
"A Word About Banks and the Laundering of Drug Money," Aug. 18, 2012, http://www.golemxiv.co.uk/2012/08/a-word-about-banks-and-the-laundering-of-drug-money/.
Official Communication for Great Britain Patent Application No. 1404574.4 dated Dec. 18, 2014.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Official Communciation for Great Britain Patent Application No. 1411984.6 dated Dec. 22, 2014.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Microsoft Office—Visio, "About connecting shapes," <http://office.microsoft.com/en-us/visio-help/about-connecting-shapes-HP085050369.aspx> printed Aug. 4, 2011 in 6 pages.
Official Communication for European Patent Application No. 14189802.3 dated May 11, 2015.
Official Communication for European Patent Application No. 14189344.6 dated Feb. 20, 2015.
Definition "Overlay", downloaded Jan. 22, 2015, 1 page.
Manno et al., "Introducing Collaboration in Single-user Applications through the Centralized Control Architecture," 2010, pp. 10.
Boyce, Jim, "Microsoft Outlook 2010 Inside Out," Aug. 1, 2010, retrieved from the internet https://capdtron.files.wordpress.com/2013/01/outlook-2010-inside_out.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for European Patent Application No. 14197895.7 dated Apr. 28, 2015.

(56) References Cited

OTHER PUBLICATIONS

Official Communication for European Patent Application No. 14199182.8 dated Mar. 13, 2015.
Huff et al., "Calibrating the Huff Model Using ArcGIS Business Analyst," ESRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Official Communication for New Zealand Patent Application No. 622517 dated Apr. 3, 2014.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Official Communication for European Patent Application No. 14189347.9 dated Mar. 4, 2015.
Keylines.com, "KeyLines Datasheet," Mar. 2014, <http://keylines.com/wp-content/uploads/2014/03/KeyLines-datasheet.pdf> downloaded May 12, 2014 in 2.
Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 628161 dated Aug. 25, 2014.
Huff, David L., "Parameter Estimation in the Huff Model," ESRI, ArcUser, Oct.-Dec. 2003, pp. 34-36.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Canese et al., "Chapter 2: PubMed: The Bibliographic Database," The NCBI Handbook, Oct. 2002, pp. 1-10.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Thompson, Mick, "Getting Started with GEO," Getting Started with GEO, Jul. 26, 2011.
Delcher et al., "Identifying Bacterial Genes and Endosymbiont DNA with Glimmer," BioInformatics, vol. 23, No. 6, 2007, pp. 673-679.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Official Communication for New Zealand Patent Application No. 628585 dated Aug. 26, 2014.
Bluttman et al., "Excel Formulas and Functions for Dummies," 2005, Wiley Publishing, Inc., pp. 280, 284-286.
Official Communication for European Patent Application No. 14180432.8 dated Jun. 23, 2015.
Official Communication for European Patent Application No. 14180281.9 dated Jan. 26, 2015.
Hibbert et al., "Prediction of Shopping Behavior Using a Huff Model Within a GIS Framework," Healthy Eating in Context, Mar. 18, 2011, pp. 16.
Sirotkin et al., "Chapter 13: The Processing of Biological Sequence Data at NCBI," The NCBI Handbook, Oct. 2002, pp. 1-11.
Madden, Tom, "Chapter 16: The BLAST Sequence Analysis Tool," The NCBI Handbook, Oct. 2002, pp. 1-15.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Notice of Acceptance for Australian Patent Application No. 2014250678 dated Oct. 7, 2015.
Official Communication for Great Britain Patent Application No. 1408025.3 dated Nov. 6, 2014.
"A First Look: Predicting Market Demand for Food Retail using a Huff Analysis," TRF Policy Solutions, Jul. 2012, pp. 30.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Sigrist, et al., "PROSITE, a Protein Domain Database for Functional Characterization and Annotation," Nucleic Acids Research, 2010, vol. 38, pp. D161-D166.
"The FASTA Program Package," fasta—36.3.4, Mar. 25, 2011, pp. 29.
Mizrachi, Ilene, "Chapter 1: Gen Bank: The Nuckeotide Sequence Database," The NCBI Handbook, Oct. 2002, pp. 1-14.
U.S. Appl. No. 13/247,987, filed Sep. 28, 2011, Office Action, dated Apr. 2, 2015.
U.S. Appl. No. 13/831,791, filed Mar. 15, 2013, Office Action, dated Mar. 4, 2015.
U.S. Appl. No. 13/835,688, filed Mar. 15, 2013, First Office Action Interview, dated Jun. 17, 2015.
U.S. Appl. No. 13/839,025, filed Mar. 15, 2013, Restriction Requirement, dated Apr. 2, 2015.
U.S. Appl. No. 14/102,394, filed Dec. 10, 2013, Notice of Allowance, Aug. 25, 2014.
U.S. Appl. No. 14/108,187, filed Dec. 16, 2013, Notice of Allowance, dated Aug. 29, 2014.
U.S. Appl. No. 14/135,289, filed Dec. 19, 2013, Notice of Allowance, dated Oct. 14, 2014.
U.S. Appl. No. 14/148,568, filed Jan. 6, 2014, Office Action, dated Oct. 22, 2014.
U.S. Appl. No. 14/148,568, filed Jan. 6, 2014, Office Action, dated Mar. 26, 2015.
U.S. Appl. No. 14/192,767, filed Feb. 27, 2014, Notice of Allowance, dated Dec. 16, 2014.
U.S. Appl. No. 14/225,006, filed Mar. 25, 2014, First Office Action Interview, dated Sep. 10, 2014.
U.S. Appl. No. 14/225,006, filed Mar. 25, 2014, First Office Action Interview, dated Feb. 27, 2015.
U.S. Appl. No. 14/225,084, filed Mar. 25, 2014, First Office Action Interview, dated Sep. 2, 2014.
U.S. Appl. No. 14/225,084, filed Mar. 25, 2014, Notice of Allowance, dated May 4, 2015.
U.S. Appl. No. 14/225,084, filed Mar. 25, 2014, First Office Action Interview, dated Feb. 20, 2015.
U.S. Appl. No. 14/225,160, filed Mar. 25, 2014, Final Office Action, datd Feb. 11, 2015.
U.S. Appl. No. 14/225,160, filed Mar. 25, 2014, Advisory Action, dated May 20, 2015.
U.S. Appl. No. 14/225,160, filed Mar. 25, 2014, First Office Action Interview, dated Oct. 22, 2014.
U.S. Appl. No. 14/268,964, filed May 2, 2014, First Office Action Interview, dated Sep. 3, 2014.
U.S. Appl. No. 14/268,964, filed May 2, 2014, Notice of Allowance, dated Dec. 3, 2014.
U.S. Appl. No. 14/289,596, filed May 28, 2014, First Office Action Interview, dated Jul. 18, 2014.
U.S. Appl. No. 14/289,596, filed May 28, 2014, Final Office Action, dated Jan. 26, 2015.
U.S. Appl. No. 14/289,599, filed May 28, 2014, First Office Action Interview, dated Jul. 22, 2014.
U.S. Appl. No. 14/289,599, filed May 28, 2014, Final Office Action, May 29, 2015.
U.S. Appl. No. 14/294,098, filed Jun. 2, 2014, Final Office Action, dated Nov. 6, 2014.

(56) References Cited

OTHER PUBLICATIONS

U.S. Appl. No. 14/294,098, filed Jun. 2, 2014, First Office Action Interview, dated Aug. 15, 2014.
U.S. Appl. No. 14/294,098, filed Jun. 2, 2014, Notice of Allowance, dated Dec. 29, 2014.
U.S. Appl. No. 14/306,138, filed Jun. 16, 2014, Final Office Action, dated Feb. 18, 2015.
U.S. Appl. No. 14/306,138, filed Jun. 16, 2014, First Office Action Interview, dated Sep. 23, 2014.
U.S. Appl. No. 14/306,138, filed Jun. 16, 2014, Office Action, dated May 26, 2015.
U.S. Appl. No. 14/306,147, filed Jun. 16, 2014, First Office Action Interview, dated Sep. 9, 2014.
U.S. Appl. No. 14/306,147, filed Jun. 16, 2014, Final Office Action, dated Feb. 19, 2015.
U.S. Appl. No. 14/306,154, filed Jun. 16, 2014, First Office Action Interview, dated Sep. 9, 2014.
U.S. Appl. No. 14/306,154, filed Jun. 16, 2014, Final Office Action, dated Mar. 11, 2015.
U.S. Appl. No. 14/306,154, filed Jun. 16, 2014, Advisory Action, dated May 15, 2015.
U.S. Appl. No. 14/319,765, filed Jun. 30, 2014, First Office Action Interview, dated Feb. 4, 2015.
U.S. Appl. No. 14/319,765, filed Jun. 30, 2014, First Office Action Interview, dated Nov. 25, 2014.
U.S. Appl. No. 14/323,935, filed Jul. 3, 2014, Office Action, dated Jun. 22, 2015.
U.S. Appl. No. 14/323,935, filed Jul. 3, 2014, First Office Action Interview, dated Nov. 28, 2014.
U.S. Appl. No. 14/323,935, filed Jul. 3, 2014, First Office Action Interview, dated Mar. 31, 2015.
U.S. Appl. No. 14/326,738, filed Jul. 9, 2014, First Office Action Interview, dated Dec. 2, 2014.
U.S. Appl. No. 14/326,738, filed Jul. 9, 2014, First Office Action Interview, dated Mar. 31, 2015.
U.S. Appl. No. 14/473,552, filed Aug. 29, 2014, Interview Summary, dated Feb. 24, 2015.
U.S. Appl. No. 14/486,991, filed Sep. 15, 2014, Office Action, dated Mar. 10, 2015.
U.S. Appl. No. 14/504,103, filed Oct. 1, 2014, First Office Action Interview, dated Feb. 5, 2015.
U.S. Appl. No. 14/504,103, filed Oct. 1, 2014, Notice of Allowance, dated May 18, 2015.
U.S. Appl. No. 14/504,103, filed Oct. 1, 2014, First Office Action Interview, dated Mar. 31, 2015.
U.S. Appl. No. 14/579,752, filed Dec. 22, 2014, First Office Action Interview, dated May 26, 2015.
U.S. Appl. No. 14/616,080, filed Feb. 6, 2015, Notice of Allowance, dated Apr. 2, 2015.
U.S. Appl. No. 14/639,606, filed Mar. 5, 2015, First Office Action Interview, dated May 18, 2015.
U.S. Appl. No. 14/639,606, filed Mar. 5, 2015, First Action Interview, dated Jul. 24, 2015.
U.S. Appl. No. 14/306,147, filed Jun. 16, 2014, Office Action, dated Aug. 7, 2015.
U.S. Appl. No. 14/319,765, filed Jun. 30, 2014, Final Office Action, dated Jun. 16, 2015.
U.S. Appl. No. 14/289,596, filed May 28, 2014, Advisory Action, dated Apr. 30, 2015.
U.S. Appl. No. 14/225,006, filed Mar. 25, 2014, Final Office Action, dated Sep. 2, 2015.
U.S. Appl. No. 13/836,815, filed Mar. 15, 2013, Office Action, dated Oct. 24, 2015.
U.S. Appl. No. 14/579,752, filed Dec. 22, 2014, Final Office Action, dated Aug. 19, 2015.
U.S. Appl. No. 13/839,026, filed Mar. 15, 2013, Notice of Allowance, dated Jul. 6, 2015.
U.S. Appl. No. 14/306,154, filed Jun. 16, 2014, Office Action, dated Jul. 6, 2015.
U.S. Appl. No. 14/306,138, filed Jun. 16, 2014, Final Office Action, dated Sep. 14, 2015.
U.S. Appl. No. 14/473,860, filed Aug. 29, 2014, Notice of Allowance, dated Jan. 5, 2015.
U.S. Appl. No. 13/831,199, filed Mar. 14, 2013, Office Action, dated May 9, 2016.
U.S. Appl. No. 14/690,905, filed Apr. 20, 2015, Office Action, dated Oct. 7, 2015.
U.S. Appl. No. 14/196,814, filed Mar. 4, 2014, First Office Action Interview, dated Apr. 16, 2014.
U.S. Appl. No. 14/813,749, filed Jul. 30, 2015, Office Action, dated Sep. 28, 2015.
U.S. Appl. No. 14/225,160, filed Mar. 25, 2014, Office Action, dated Aug. 12, 2015.
U.S. Appl. No. 13/831,199, filed Mar. 14, 2013, Final Office Action, dated Nov. 4, 2016.
U.S. Appl. No. 14/490,612, filed Sep. 18, 2014, Final Office Action, dated Aug. 18, 2015.
U.S. Appl. No. 14/486,991, filed Sep. 15, 2014, Notice of Allowance, dated May 1, 2015.
U.S. Appl. No. 14/027,118, filed Feb. 4, 2016, Notice of Allowance, dated Apr. 4, 2016.
U.S. Appl. No. 15/047,405, filed Feb. 18, 2016, Office Action, dated Apr. 1, 2016.
U.S. Appl. No. 14/726,353, filed May 29, 2015, First Office Action Interview, dated Sep. 10, 2015.
U.S. Appl. No. 13/247,987, filed Sep. 28, 2011, Office Action, dated Sep. 22, 2015.
U.S. Appl. No. 12/556,318, filed Sep. 9, 2009, Office Action, dated Jul. 2, 2015.
U.S. Appl. No. 14/631,633, filed Feb. 25, 2015, First Office Action Interview, dated Sep. 10, 2015.
U.S. Appl. No. 14/326,738, filed Jul. 9, 2014, Final Office Action, dated Jul. 31, 2015.
U.S. Appl. No. 14/077,159, filed May 3, 2016, Office Action, dated Mar. 12, 2014.
U.S. Appl. No. 15/145,177, filed May 3, 2016, Office Action, dated Jul. 29, 2016.
U.S. Appl. No. 14/289,599, filed May 28, 2014, Advisory Action, dated Sep. 4, 2015.
U.S. Appl. No. 15/145,177, filed May 3, 2016, Final Office Action, dated Aug. 7, 2015.
U.S. Appl. No. 14/319,765, filed Jun. 30, 2014, Advisory Action, dated Sep. 10, 2015.
U.S. Appl. No. 14/077,159, filed Nov. 11, 2013, Notice of Allowance, dated Aug. 15, 2014.
U.S. Appl. No. 14/196,814, filed Mar. 4, 2014, Final Office Action, dated Dec. 14, 2016.
U.S. Appl. No. 14/196,814, filed Mar. 4, 2014, Notice of Allowance, dated Apr. 6, 2017.
U.S. Appl. No. 14/225,084, filed Mar. 25, 2014, Office Action, dated Sep. 11, 2015.
U.S. Appl. No. 13/839,026, filed Mar. 15, 2013, Office Action, dated Aug. 4, 2015.
U.S. Appl. No. 14/196,814, filed Mar. 4, 2014, Final Office Action, dated Jun. 13, 2016.
U.S. Appl. No. 14/134,558, filed Dec. 19, 2013, Office Action, 10/07/20165.
U.S. Appl. No. 13/831,791, filed Mar. 15, 2013, Final Office Action, dated Aug. 6, 2015.
U.S. Appl. No. 14/806,517, filed Jul. 22, 2015, First Office Action Interview, dated Oct. 26, 2016.
U.S. Appl. No. 13/831,199, filed Mar. 14, 2013, Office Action, dated May 19, 2017.
U.S. Appl. No. 13/831,199, filed Mar. 14, 2013, Notice of Allowance, dated Jan. 2, 2018.
U.S. Appl. No. 14/196,814, filed Mar. 4, 2014, First Office Action Interview, dated Aug. 13, 2014.
U.S. Appl. No. 13/728,879, filed Dec. 27, 2012, Office Action, dated Nov. 20, 2015.
U.S. Appl. No. 14/225,160, filed Mar. 25, 2014, First Office Action Interview, dated Jul. 29, 2014.

(56) References Cited

OTHER PUBLICATIONS

U.S. Appl. No. 13/728,879, filed Dec. 27, 2012, Final Office Action, dated Aug. 12, 2015.
U.S. Appl. No. 14/196,814, filed Mar. 4, 2014, Office Action, dated May 5, 2015.
U.S. Appl. No. 14/088,251, filed Nov. 22, 2013, Final Office Action, dated Apr. 18, 2016.
U.S. Appl. No. 14/875,536, filed Oct. 5, 2015, First Office Action Interview, dated Nov. 16, 2017.
U.S. Appl. No. 13/838,815, filed Mar. 15, 2013, Notice of Allowance, dated Jan. 29, 2015.
U.S. Appl. No. 14/196,814, filed Mar. 4, 2014, Final Office Action, dated Dec. 18, 2014.
U.S. Appl. No. 12/840,673, filed Jul. 21, 2010, Final Office Action, dated Jan. 2, 2015.
U.S. Appl. No. 13/728,879, filed Dec. 27, 2012, First Office Action Interview, dated Mar. 17, 2015.
U.S. Appl. No. 12/840,673, filed Jul. 21, 2010, Office Action, dated Sep. 17, 2014.
U.S. Appl. No. 13/948,859, filed Jul. 23, 2013, Notice of Allowance, dated Dec. 10, 2014.
U.S. Appl. No. 13/728,879, filed Dec. 27, 2012, First Office Action Interview, dated Jan. 27, 2015.
U.S. Appl. No. 12/840,673, filed Jul. 21, 2010, Notice of Allowance, dated Apr. 6, 2015.
U.S. Appl. No. 13/838,815, filed Mar. 15, 2013, Notice of Allowance, dated Mar. 3, 2015.
U.S. Appl. No. 14/196,814, filed Mar. 4, 2014, Interview Summary, dated Jul. 28, 2015.
U.S. Appl. No. 14/319,161, filed Jun. 30, 2014, Notice of Allowance, dated May 4, 2015.
U.S. Appl. No. 13/839,026, filed Mar. 15, 2013, Notice of Allowance, dated Mar. 11, 2016.
U.S. Appl. No. 14/580,218, filed Dec. 23, 2014, Final Office Action, dated Jan. 7, 2016.
U.S. Appl. No. 15/598,752, filed May 18, 2017, Office Action, dated Aug. 29, 2017.
U.S. Appl. No. 14/319,161, filed Jun. 30, 2014, Final Office Action, dated Jan. 23, 2015.
U.S. Appl. No. 14/730,123, filed Jun. 3, 2015, First Office Action Interview, dated Sep. 21, 2015.
U.S. Appl. No. 13/181,392, filed Jul. 12, 2011, Notice of Allowance, dated Jan. 22, 2015.
U.S. Appl. No. 13/838,815, filed Mar. 15, 2013, Notice of Allowance, dated Jun. 19, 2015.
U.S. Appl. No. 14/487,342, filed Sep. 16, 2014, Notice of Allowance, dated Sep. 23, 2015.
U.S. Appl. No. 14/334,232, filed Jul. 17, 2014, Notice of Allowance, dated Nov. 10, 2015.
U.S. Appl. No. 14/690,905, filed Apr. 20, 2015, Notice of Allowance, dated Nov. 23, 2015.
U.S. Appl. No. 13/181,392, filed Jul. 12, 2011, Final Office Action, dated Aug. 28, 2014.
U.S. Appl. No. 14/088,251, filed Nov. 22, 2013, Office Action, dated Feb. 12, 2015.
U.S. Appl. No. 14/487,342, filed Sep. 16, 2014, First Office Action Interview, dated Apr. 23, 2015.
U.S. Appl. No. 14/027,118, filed Sep. 13, 2013, Office Action, dated May 12, 2015.
U.S. Appl. No. 14/088,251, filed Nov. 22, 2013, Final Office Action, dated May 20, 2015.
U.S. Appl. No. 13/831,199, filed Mar. 14, 2013, Office Action, dated Jun. 3, 2015.
U.S. Appl. No. 14/088,251, filed Nov. 22, 2013, Interview Summary, dated Jun. 30, 2015.
U.S. Appl. No. 14/334,232, filed Jul. 17, 2014, Office Action, dated Jul. 10, 2015.
U.S. Appl. No. 14/088,251, filed Nov. 22, 2013, Office Action, dated Aug. 26, 2015.
U.S. Appl. No. 14/027,118, filed Sep. 13, 2013, Office Action, dated Sep. 16, 2015.
U.S. Appl. No. 13/831,199, filed Mar. 14, 2013, Final Office Action, dated Oct. 6, 2015.
U.S. Appl. No. 14/196,814, filed Mar. 4, 2014, Office Action, dated Oct. 7, 2015.
U.S. Appl. No. 13/839,026, filed Mar. 15, 2013, Restriction Requirement, dated Apr. 2, 2015.
U.S. Appl. No. 14/077,159, filed Nov. 11, 2013, First Office Action Interview, dated Mar. 12, 2014.
U.S. Appl. No. 14/985,201, filed Dec. 30, 2015, First Office Action Interview, dated Jun. 15, 2017.
U.S. Appl. No. 14/985,201, filed Dec. 30, 2015, First Office Action Interview, dated Oct. 3, 2017.
U.S. Appl. No. 14/985,201, filed Dec. 30, 2015, Notice of Allowance, dated Apr. 18, 2018.

SIMPLE WEB SEARCH

PRIORITY CLAIM

This application claims the benefit under 35 U.S.C. § 120 as a continuation of application Ser. No. 14/985,201, filed Dec. 30, 2015, which is a continuation of application Ser. No. 14/487,342, filed Sep. 16, 2014, now U.S. Pat. No. 9,262,529, which is a continuation of application Ser. No. 14/077,159, filed Nov. 11, 2013, now U.S. Pat. No. 8,868,537, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to data processing techniques for conducting searches.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A search engine is a system of one or more computing devices, or components thereof, which searches one or more repositories of data for data structures that match search constraints indicated by search requests. One common type of search engine is a web search engine, which conducts searches for data structures such as web pages and other web-based documents, based on keywords and/or other constraints. However, there are many other types of search engines, and these search engines permit searches against a wide variety of repositories of data.

A search user interface, or "search interface" as abbreviated herein, is a point of interaction between an information seeker, or "user," and one or more search engines. Via the search interface, a user may submit a search request to a search engine. Via the search interface, the user may further receive information concerning one or more data structures, or "search results," that the search engine has identified as matching the search request. One common type of search interface is a web-based search interface, in which a search engine provides a web browser with a web page comprising controls via which a user may input search request parameters. Once the parameters have been entered, the user's web browser typically sends the parameters to a search engine using a request in a Hyper-Text Transfer Protocol (HTTP) or other suitable web-based protocol. The search engine then returns the search results to the browser.

Creating search interfaces is a task conventionally left to skilled programmers. For example, in the context of web-based search interfaces, creation of search interfaces conventionally requires familiarity with Hyper-Text Markup Language (HTML), JavaScript, and/or other web-based standards or tools. Search interface creation further requires knowledge of search Application Programming Interfaces (APIs), which typically vary from search engine to search engine.

SUMMARY OF THE INVENTION

The appended claims may serve to summarize the invention.

DETAILED DESCRIPTION

Figure 1:
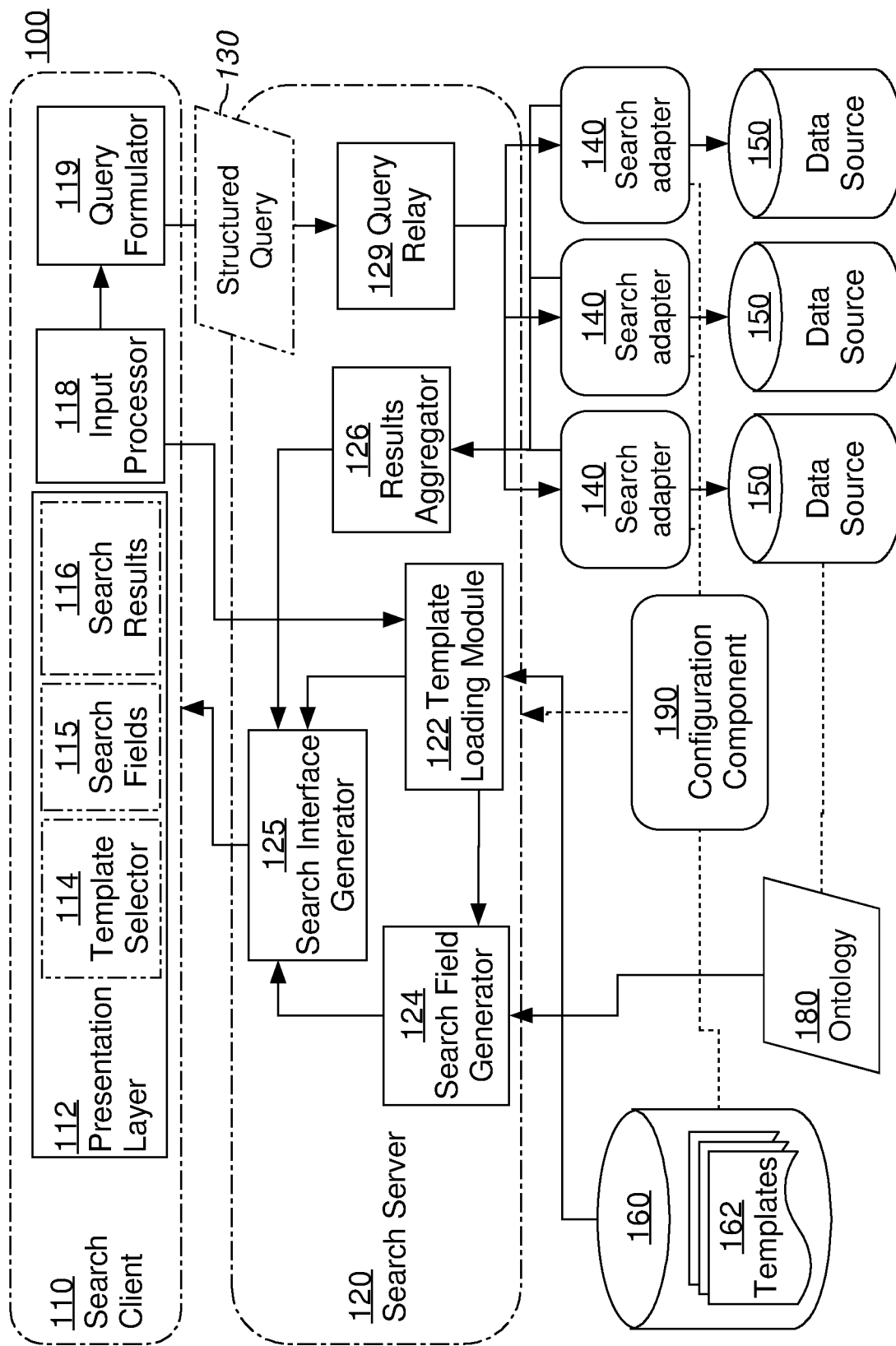
FIG. 1 illustrates an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

According to an embodiment, a system of one or more computing devices is utilized for, among other purposes, creating a template-driven search interface and conducting searches thereon. In an embodiment, the one or more computing devices include or are coupled to: a template repository; search templates stored in the template repository, each of the search templates comprising at least: field specification data that specify search interface fields for obtaining search input data, and query specification data that specify how to generate structured queries based on the search input data obtained for the one or more of the search interface fields; a search field generator that is configured to generate search fields indicated by the field specification data; a template loading module, coupled to the template repository, that is configured to identify one or more available search templates in the template repository; and a search interface generator, coupled to the search field generator and template loading module, that is configured to generate a search interface comprising template selection controls that are configured to select available search templates that are identified by the template loading module. The template loading module is configured to receive template selection input via the template selection controls. The search interface generator is configured to update the search interface to include particular search fields generated by the search field generator for a particular search template selected by the template selection input. The search interface is configured to receive particular search input via the particular search fields, and to cause generation of a particular structured query based on the particular search input and on particular query specification data in the particular search template.

In an embodiment, the search interface generator is configured to generate search interface provisioning instructions which, when executed by a client computing device, cause the client computing device to implement the search interface. In an embodiment, the search interface generator is further configured to send the search interface provisioning instructions to the client computing device. In an embodiment, the search interface generator is further configured to generate particular query formulation logic based on the particular query specification data, wherein the query formulation logic causes the generation of the particular structured query based on the particular search input and particular query specification data in the particular search template. The search interface generator is further configured to send the search interface provisioning instructions, including the particular query formulation logic, to the client computing device. In an embodiment, the search interface provisioning instructions include instructions for generating interface controls by which the particular search input for the particular search fields is received.

In an embodiment, the one or more computing devices comprises a plurality of search adapters that are configured to receive the structured queries, to cause searches to be conducted against a plurality of data sources based on the structured queries, and to return particular search results based on the searches. The search interface is configured to display the returned search results. In an embodiment, at least a first search adapter of the plurality of search adapters is configured to translate the particular structured query into a first query, to send the first query to a particular data source, receive first search results responsive to the first query, and to convert the first search results into a common format of the particular search results. In an embodiment, the particular template comprises data source specification data. The search interface comprises data source selection controls generated based on the data source specification data. The search interface is configured to request performing one or more searches, based on the particular structured query, against one or more particular data sources specified by data source specification input received in association with the data source selection controls.

In an embodiment, the search field generator is configured to analyze an ontology to identify properties of a data structure type specified in the field specification data, and to generate at least a first search field based at least partly upon a particular property of the identified properties. In an embodiment, the search field generator is configured to analyze an ontology to identify properties of a data structure type specified in the field specification data, and generate an interface control for defining a search filter that compares an input value to at least a particular property of the data structure type. In an embodiment, the query specification data specifies query clauses. The query clauses include at least search filter clauses and complex clauses. The search filter clauses include a first search filter clause that specifies how a first search field is compared to data structures when conducting a search. The complex clauses include a first complex clause that specifies a logical relationship between other query clauses.

According to an embodiment, a computer-implemented method comprises receiving a selection of a search template via one or more template selection controls that are configured to select from search templates for formulating searches; responsive to the selection of the search template, presenting search interface fields specified by field specification data within the search template; receiving search input via two or more of the search interface fields, the search input including first input via a first field and second input via a second field; identifying, based on query specification data within the search template, a relationship between the first input and the second input; based on the identified relationship, generating a particular query clause that includes the first input, the second input, and a search directive that indicates the identified relationship between the first input and the second input; based on the search input and the query specification data within the search template, generating a structured query based on the search input, the structured query including the particular query clause; sending the structured query to one or more search modules; and receiving search results responsive to the structured query.

In an embodiment, the method further comprises determining to which of a plurality of search modules to send the structured query based on data source specification data in the search template. In an embodiment, the method further comprises determining to which of a plurality of search modules to send the structured query based at least on third input of the search input, the third input selecting one or more controls corresponding to the one or more search modules. In an embodiment, the search directive is one of: an and directive, an or directive, an adjacent directive, or a within directive. In an embodiment, the query specification data indicates a required value for a particular search filter included in the structured query. In an embodiment, the query specification data specifies that the structured query is to include a search filter that causes the one or more search modules to execute a particular comparison operation between a particular input value for a particular field of the search interface fields and a particular data structure property of data structures that are searched. In an embodiment, the field specification data associates a particular search interface field with a particular data structure type. The method further comprises accessing ontological data to identify properties of the particular data structure type, and presenting, adjacent to the particular search interface field, controls for selecting a particular property to which corresponding input for the field is to be compared.

In an embodiment, the one or more search modules are a plurality of search modules. Each of the plurality of search modules identifies search steps to perform with respect to one or more data sources, based on the structured query. Each of the plurality of search modules generates sets of search results in a common format. The method further comprises aggregating the sets of search results as they are received from the plurality of search modules. In an embodiment, the method further comprises a first search module of the one or more search modules translating the structured query into a first query to send to a first search engine, and a second search module of the one or more search modules translating the structured query into a second query to send to a second search engine. The search results include first search results from the first search engine and second search results from the second search engine. In an embodiment, the method further comprises the first search module converting first search results from the first search engine into a common format and the second search module converting second search results from the second search engine into the common format. The search results include the converted first search results and the converted second search results.

In an embodiment, presenting search interface fields comprises sending search interface creation instructions to a search client. Identifying the relationship, generating the particular query clause, and generating the structured query comprise generating query formulation instructions based on the query specification data and sending the query formulation instructions to the search client.

2.0. Structural Overview

Embodiments provide computing devices, logic, processes and/or software organized in simplified frameworks that are useful for creating search interfaces and conducting searches. In some embodiments, the frameworks provide streamlined syntaxes and grammars for defining one or more elements of a search interface, and for formulating search requests based on inputs received in association with these elements. In some embodiments, the frameworks simplify communications with search engines by providing an intermediary translation level between the search interfaces and the search engines, thereby permitting communication with the search engines via a universal standard. In some embodiments, the frameworks include extensible programmatic interfaces by which new search engine or search interface functions can be added to the system in a modular fashion. In many cases, the frameworks reduce or eliminate the need for an intricate understating of complex coding languages or APIs when defining search interfaces, thereby allowing less-technical users and/or administrators to design and deploy customized search interfaces.

FIG. 1 illustrates an example computing system 100 in which the techniques described herein may be practiced, according to an embodiment. System 100 is a computer-based system. The components of system 100 are implemented at least partially by electronic digital hardware at one or more computing devices, such as one or more hardware processors executing program instructions stored in one or more memories and configured for performing functions described herein.

2.1. Search Server

System 100 comprises a search server 120. Search server 120 is not necessarily a search engine, but rather mediates between search clients 110 and one or more search adapters 140. In an embodiment, search server 120 comprises, among other elements, a template loading module 122, search field generator 124, search interface generator 125, results aggregator 126, and query relay component 129. These elements are described in subsequent sections.

In some embodiments, search server 120 may be a component of one or more server computing devices that are communicatively coupled to one or more client computers at which the search clients 110 are implemented. For example, search server 120 may be a web server, or an application thereof, that communicates over an intranet and/or wide area network with the client devices at which the search clients 110 are deployed. In other embodiments, search server 120 and search clients 110 are implemented at the same computing device. In some embodiments, search server 120 may further be deployed at the same computing device as some or all of search adapters 140 and/or data sources 150. In other embodiments, search server 120 is deployed at a different one or more computing devices than are search adapters 140 and data sources 150.

2.2. Templates

Search server 120 is coupled to one or more data repositories, including a repository 160 of templates 162. Search server 120 comprises a template loading module 122 that accesses and parses templates 162 in repository 160. Repository 160 and templates 162 may be any suitable data structure for storing template data. For example, repository 160 may be a file system, while templates 162 may be files within the file system. As another example, repository 160 may be a database, and templates 162 may be data structures within the database. Each template 162 may be configured to describe a different search interface that may be generated by search server 120. Thus, for example, an administrator may define new search interfaces by creating new templates 162. Templates may be formatted in any suitable coding or markup language. In an embodiment, the templates are structured according to a schema that has a more simplified and/or streamlined syntax than HTML or other common general purpose content presentation languages, to permit creation of templates without requiring the creator to learn such languages.

Templates 162 include field specification data. For example, the field specification data may include an enumerated list of input fields. The field specification data may specify a control type for each field. For example, the field specification data may specify that input for a particular field is to be collected using a specific type of graphical interface control, such as a textbox, text area, checkbox, pull-down list, and so forth. The field specification data may further indicate an order in which the controls are to be presented. The field specification data may further indicate input constraints for some or all of the identified search fields. These constraints may include an expected format or structure, such as a string, integer, date, range of numbers, and so forth. These constraints may further or alternatively specify exactly which options a user may select from, such as in a pull-down list. The field specification data may further specify default input values, search field identifiers, and/or descriptive labels.

Templates 162 may comprise query specification data, which specify how to generate a structured query based on the fields specified in the field specification data. For example, the query specification data may specify logical relationships between certain search field inputs and/or clauses based thereon. These logical operations may include conjunctive operations such as "and," "adjacent to," or "within a certain proximity," or disjunctive operations such as "or." As another example, the query specification data may specify how one or more search fields are to be compared to data structures when conducting a search. This may be done, for instance, by specifying comparison operations, such as equals, does not equal, greater than, lesser than, and so forth, to be performed between certain search field inputs and the values of certain properties of or metadata for the data structures to be searched. Or, the query specification data may indicate that a search field represents keyword(s) to be searched across all data structure elements. In some embodiments, the query specification data may be entirely separate from the field specification data. In other embodiments, some or all of the query specification data may be intermingled with the field specification data. Since different templates may have different query specification data, different types of search queries may result from two templates 162 even if their field specification data is the same.

Templates 162 may optionally include a data source specification. The data source specification identifies one or more of data sources 150 against which a search may be conducted. In an embodiment, certain data sources may be designated as required or optional.

2.3. Search Field Generator

Template loading module 122 is configured to provide search field generator 124 with the field specification data from a selected one of templates 162. Based at least partly on the field specification data, search field generator 124 identifies search fields that should be included within a search interface. The search field generator 124 then generates these search fields. Generating the search fields may comprise, for instance, generating instructions and/or data structures necessary for a search client 110 to implement search field controls for collecting input for the search fields. For example, for web-based interfaces, generating the search fields may comprise generating HTML and/or JavaScript for displaying one or more field controls within a search form. Generating the search fields for web-based interfaces may further comprise, if necessary, generating JavaScript functions for validating inputs in accordance to any specified constraints.

In an embodiment, the field specification data does not directly specify certain search fields and/or input constraints, but rather indirectly identifies certain search fields and/or input constraints by referencing metadata from an ontology 180. Ontology 180, which is optional, includes metadata that describes types of data structures to which some or all of data sources 150 provide access. Search field generator 124 is configured to utilize this metadata to identify and generate the certain search fields. In an embodiment, for example, the field specification data may specify that a separate search field be generated for each property of a referenced metadata element in ontology 180. Search field generator 124 may automatically identify these properties based on ontology 180, and generate search fields accordingly.

In an embodiment, the field specification data may indicate that the input provided for a certain search field should be subject to constraints imposed on certain predefined metadata elements. For example, the field specification data may reference a specific metadata element to indicate that input for the field be an "age," "gender," "state," or other predefined element of ontology 180. In an embodiment, search field generator 124 may even be configured to access a data source 150 described by the ontology, to determine exactly which specific values or data objects are already found in the data source for the referenced metadata element. The input may then be constrained to these specific values or data objects. The control for the certain search field may even prompt the user to select from the specific values via a pull-down menu, predictive-text textbox, or other suitable mechanism.

2.4. Interface Generator

Search interface generator 125 generates search interfaces based on templates 162, and causes search clients 110 to implement the generated search interfaces. Search interface generator 125 is configured to generate a search interface for a selected template 162 responsive to one or more types of user-initiated instructions, depending on the embodiment. For example, in an embodiment, search interface generator 162 generates a search interface responsive to a user-initiated HTTP or other web-based request from a web browser at a client device. In another embodiment, search interface generator 162 generates a search interface responsive to a local API call from a search application executing on the same computing device as search server 120. The user-initiated request may specify a search template, or a default search template may be selected.

Generating a search interface comprises generating instructions and/or data structures that a computing device may execute to implement the search interface. For example, generating a search interface may comprise generating HTML, JavaScript, and/or other suitable data structures or code that, when interpreted by a web browser, causes a client device to provide the search interface. As another example, generating a search interface may comprise generating SOAP, REST, or other suitable code for instructing a client-based application to provide the search interface. As another example, generating a search interface may comprise generating lower-level code that is directly executable by a computing device for implementing the search interface.

In an embodiment, different versions of a search interface may be generated for different search clients 110 based on the same template. For example, in an embodiment there may be different versions of a search interface targeted to search clients 110 at different web browsers. In an embodiment, there may be different versions of a search interface targeted to any combination of: one or more web browsers, one or more smartphone applications, or one or more desktop applications.

When generating a search interface, search interface generator 125 receives information included in or derived from a selected template from template loading module 122. This information includes at least the query specification data and, if specified by the template, the data source specification. Search interface generator 125 further receives the search fields generated for the selected template from search field generator 124. Based on the query specification data and the data source specification, search interface generator 125 generates query formulator instructions that instruct search clients 110 in constructing and submitting a structured query based on any input received via the search fields. For example, the query formulator instructions may be JavaScript code or other suitable instructions for executing a query formulator 119, as described in other sections.

Search interface generator 125 may further generate other search interface elements, such as a template selector or a presentation of search results, as discussed in other sections. Once all of the search interface elements are generated, search interface generator 125 sends the search interface to a requesting application and/or causes execution of the instructions for providing the search interface. The generated search interface may be, for example, an entire web page or screen window, or the generated interface may be designated portions thereof, such as a search form subsection within a web page.

2.5. Search Client

System 100 may comprise any number of search clients 110. A search client 110 implements the search interfaces generated by search interface generator 125, based on instructions and/or data structures received from search interface generator 125. Search client 110 may comprise, for instance, a generic web browser, a browser plug-in or module, a dedicated search application, or any other suitable tool for executing or interpreting the instructions and/or data structures received from search interface generator 125. Different types of search clients 110 may exist for different platforms or working environments.

Search client 110 comprises a user search interface presentation component 112. In accordance with the instructions and/or data structures received from search interface generator 125, presentation component 112 is configured to provide, or cause the provision of, a presentation of one or more textual and/or graphical elements at one or more output components, such as a computer monitor or touch-screen device. The presented textual or graphical elements include textual and/or graphical controls, such as text boxes, check boxes, buttons, and/or other graphical user interface components. Among other controls, the textual and graphical controls include template selection controls 114 and search field controls 115.

Template selection controls 114 visually guide the user in providing inputs for selecting one of templates 162. For example, the template selection controls 114 may be a pull-down list of each template 162 in repository 160. Or, the template selection controls 114 may be a pull-down list of each template 162 in repository 160 to which a user has access, as indicated by user permission data associated with templates 162 and/or data sources 150. Input selecting a specific template triggers an instruction to the search interface generator 125 to generate a new search interface based on the selected template, which results in presentation component 112 displaying a different set of textual and/or graphical elements.

Search field controls 115 visually guide the user in providing inputs for interfacing with the one or more search engines. The search field controls 115 may include a different control for some or all of the search fields identified by search field generator 124. Certain fields may be hidden from the user. These hidden fields specify search filters that should always be applied when performing a search under a corresponding search template. For example, an interface designer may wish for a certain search interface to be restricted to only certain types of data structures within a data source, or to only data structures that have a certain property value.

The presented textual or graphical elements may further include a presentation of search results 116, as described in other sections.

2.6. Collecting Input

Search client 110 further comprises an input processor 118. Input processor 118 is configured to receive inputs for fields associated with the textual and/or graphical controls presented by the presentation component 112. The inputs may be, for example, signals from one or more user-operated input devices, interpretations of these signals based on knowledge of how the textual or graphical controls are arranged, and/or derivations thereof. For example, input processor 118 may be configured to detect when a new template has been selected using template selection controls 114, and relay corresponding instructions to template loading module 122.

As another example, input processor 118 may receive inputs that specify keywords, filters, or other search parameters in association with search field controls 115. Input processor 118 is further configured to detect input instructing search client 110 to submit a search. This input may be provided in association with a "submit" control of search field controls 115. Or, certain interactions with designated search fields, such as pressing an "Enter" key while a keyword box is selected, may be interpreted as an instruction to submit a search. In an embodiment, a new search is requested any time new input is provided via search field controls 115.

2.7. Query Formulation

Input processor 118 provides the values that were input for each of search fields 115 to a query formulator 119 that corresponds to the currently selected template 162. Query formulator 119 is a set of one or more processes that generate a structured query 130 based on the inputted values, in accordance with the query formulator instructions received from search interface generator 125. Query formulator 119 may comprise, for instance, HTML form processing logic, JavaScript functions, and/or other suitable processing logic.

The structured query 130 may take a variety of forms, depending on the embodiment. For example, in an embodiment, the structured query may be a series of name-value pairs embedded within an HTTP query string or a JSON object. In an embodiment, the structured query may comprise groups of input values associated with search directives. The search directives specify relationships between the input values in a group.

In another embodiment, structured query 130 may be a hierarchical data structure comprised of clauses, in which the hierarchical relationships of the clauses reflect logical relationships between the clauses. The clauses include search filter clauses and complex clauses. Search filter clauses are generally based upon data input in association with search field controls 115, and/or data associated with hidden search fields. While query formulator 119 will often only produce one search filter clause per search field, the query formulation instructions may in some cases cause query formulator 119 to create two or more search filter clauses for a single search field. Search filter clauses may specify, without limitation, keyword input for a particular search field, a name-value pair resulting from input for a particular search field, a comparison operation between the input data of a particular search field and one or more data structures designated by the query formulation instructions, and so forth. Complex clauses comprise a search directive that specifies a conjunctive, disjunctive, or other logical relationship between two or more search filter clauses and/or other complex clauses.

2.8. Query Relay Component

Search client 110 is configured to send the structured query 130, once constructed by query formulator 119, to a query relay component 129 of search server 120. The query relay component 129 is configured to send the structured query 130 in turn to one or more search adapters 140. In an embodiment, the structured query 130 is sent to at least some of the search adapters 140 in parallel, thus potentially resulting in returning search results from two or more search adapters 140 at the same time. In an embodiment, the structured query 130 is sent serially to some or all of the search adapters 140, in that the query relay component 129 must wait for an indication that a first search adapter 140 has concluded a search before sending the structured query 130 to a second search adapter 140.

In an embodiment, the one or more search adapters 140 to which query relay component 129 sends structured query 130 is the set of all available search adapters 140. In other embodiments, the one or more search adapters 140 to which query relay component 129 sends structured query 130 are selected by data source specification data in a template 162 and/or selected by a user via controls in search client 110. One or more search adapters 140 thus selected may be identified to query relay component 129 in, for example, the structured query 130, such as in a search filter clause or in separate data source specification data. Or query relay component 129 may determine the selected one or more search adapters 140 based on metadata associated with the structured query 130, such as interface state data or session data. The selected one or more search adapters 140 may be designated directly, or by reference to a particular data source 150, depending on the embodiment.

The one or more search adapters 140 may further be implicit from one or more search parameters described in structured query 130. For example, the query relay component 129 may be configured to access ontology 180 and determine that a certain data structure type specified in the search parameters is only available in a certain data source 150 to which only a particular search adapter 140 has access. Thus, the structured query 130 is only sent to the particular search adapter 140.

In an embodiment, each of the search adapters 140 is configured to understand a common query structure. The same single structured query 130 may thus be sent to each search adapter 140, thus avoiding the need for any given search interface to have multiple query formulators in the search client 110 or search server 120.

2.9. Search Adapters

System 100 further comprises one or more search adapters 140. Each search adapter 140 searches one or more data sources 150, or causes the one or more data sources 150 to be searched. In some embodiments, search adapters 140 function as substitutes for search engines, directly conducting searches specified by structured query 130 on data sources 150 such as databases and/or file repositories. Each search adapter 140 directly generates a set of search results. This set of search results identifies data structures, in the one or more data sources 150 to which the search adapter 140 provides access, that match the parameters specified by structured query 130. The search adapter 140 provides this set of search results to results aggregator 126 of search server 120.

In other embodiments, search adapters 140 function as query translators. In these embodiments, data sources 150 are themselves search engines, each exposing a potentially different search API. Thus, search adapters 140 reconstruct the structured query 130 as a separate query for each different data source 150 to which the search adapter 140 provides access. Each separate query conforms to a potentially different syntax and grammar, corresponding to the search API of the data source 150 to which the query is targeted. Each search adapter 140 receives one or more sets of search results from the one or more data sources 150 to which the search adapter 140 provides access. The search adapter 140 converts these sets of search results into a universal search result format, and then provides a converted set of search results to results aggregator 126 of search server 120.

In some embodiments, both types of search adapters 140 may exist.

A search adapter 140 may be configured to pre-process a query and/or post-process search results using one or more rules. For example, a search adapter 140 may be configured to add additional filters or constraints to a structured query, and/or to a translated query. As another example, search adapter 140 may be configured to normalize or aggregate search results, or properties thereof. As another example, search adapter 140 may be configured to remove duplicate search results, or apply its own ranking and/or sorting logic to the search results. In an embodiment, different search adapters 140 may provide access to the same data source 150, but differ with respect to how the search adapters 140 pre-process a query or post-process search results.

In an embodiment, a search adapter 140 iteratively identifies sets of search results. For example, the search adapter 140 may initially return a first set of results that were identified most quickly, and then return additional sets of results as they are identified.

2.10. Results Aggregator

Results aggregator 126 receives sets of search results from search adapters 140. Search results may comprise actual matching data structures from data sources 150, and/or metadata describing matching data structures. In an embodiment, search adapters 140 convert or generate each search result in each set using a common search result format. For example, each search result may be a JSON object or other data structure that conforms to a common schema. As another example, each search result may be a data object identifier. However, the actual data structures represented by the search results may conform to one or many different formats, depending on the search parameters.

Results aggregator 126 may combine and/or arrange the search results from the one or more sets using any of a variety of techniques. In an embodiment, the search results are concatenated together into a single list as they are received. In another embodiment, the search results are sorted according to any of a variety of techniques, such as in numerical or alphabetical order based on a common property of the data structures that the results represent, or based on relevance metadata provided by search adapters 140. Results aggregator 126 may further post-process the search results, by for example removing duplicates, normalizing metadata within the search results, adding additional metadata, and so forth.

2.11. Presentation of Results

In the depicted embodiment, results aggregator 126 provides the aggregated search results to the search interface generator 125. Search interface generator 125 sends instructions and/or data structures to search client 110 that cause the search client to display presentations 116 of the search results. The presentations 116 of the search result may be arranged in any fashion, and may include any suitable information representative of the data structures from data sources 150 to which the search results correspond. For example, the presentations 116 of the search results may include, without limitation, one or more of: titles, names, thumbnails, maps, addresses, descriptions, or links by which actual contents of the data structure may be viewed and/or edited. In an embodiment, the information presented in presentations 116 of the search results is limited to information that was actually returned in the search results. In other embodiments, search interface generator 125 may retrieve additional information concerning certain data structures represented by certain search results directly from data sources 150. Search interface generator 125 may use any of a variety of logic to determine how best to present a given search result. For example, certain types of data structures may have predefined view templates that indicate how those structures are to be presented within a search interface.

In an embodiment, the search results are presented as a scrollable list or tile grid. In an embodiment, one or more alternate views of the search results may be available, such as map views, node-based graphs, charts of aggregated values from the search results, or other suitable data visualizations. Search client 110 may include controls for switching between views. Search interface generator 125 may also or instead be configured to identify suitable data visualizations based on search result view data in templates 162 and/or an analysis of the data structures represented by the search results.

Depending on the embodiment, search interface generator 125 may wait to send instructions to update a search interface with new search results until after search results aggregator 126 signals that all search results have been received. Or, search interface generator 125 may continually send instructions to update the search interface as results aggregator 126 continues to receive search results from the search adapters 140. In an embodiment, search interface generator 125 need not instruct search client 110 to update the entire interface, but rather instructs the search client to update a search results section.

2.12. Configuration Component

In an embodiment, system 100 optionally comprises a configuration component 190. Configuration component 190 may be as simple as a set of one or more configuration files, or the configuration component may be an actual software application. Configuration component 190 allows users and/or administrators to register the locations of one or more resources; for example, administrators may register locations of templates 162, template repository 160, search adapters 140, and/or data sources 150. Search server 120 is configured to access configuration component 190 when looking for these resources. Thus, administrators may quickly add new functions to search server 120 by registering new resources with configuration component 190.

2.13. Extensions and Variations

System 100 as shown in FIG. 1 illustrates only one of many possible arrangements of components configured to perform the functions described herein. Other arrangements may include fewer or different components, and the division of work between the components may vary depending on the arrangement.

For example, in an embodiment, results aggregator 126 or search adapters 140 may provide search results directly to the search client 110. In such embodiments, search client 110 may include or have received instructions that would cause search client 110 to aggregate search results and/or generate presentations 116 of the search results using similar techniques to those described with respect to the results aggregator 126 and search interface generator 125. The instructions may be general, or specific to a certain search template. In an embodiment, there is no aggregation of results, and the results are instead displayed separately by data source 150. Such embodiments need not necessarily require search adapters 140 to create search results in a common format. In an embodiment, results aggregator 126 may be responsible for converting search results to a common format.

In an embodiment, query formulator 119 may be deployed at the search server 120 as opposed to the search client 110. The search client 110 sends the input values directly to the search server 120. The search server 120 determines which query formulator 119 to execute based on session data indicating which search template is used by the search client 110 from which the input values are received. In an embodiment, there is no query relay 129, and search client 110 is configured to send structure query 130 directly to each selected search adapter 140.

3.0. Functional Overview

Figure 2:
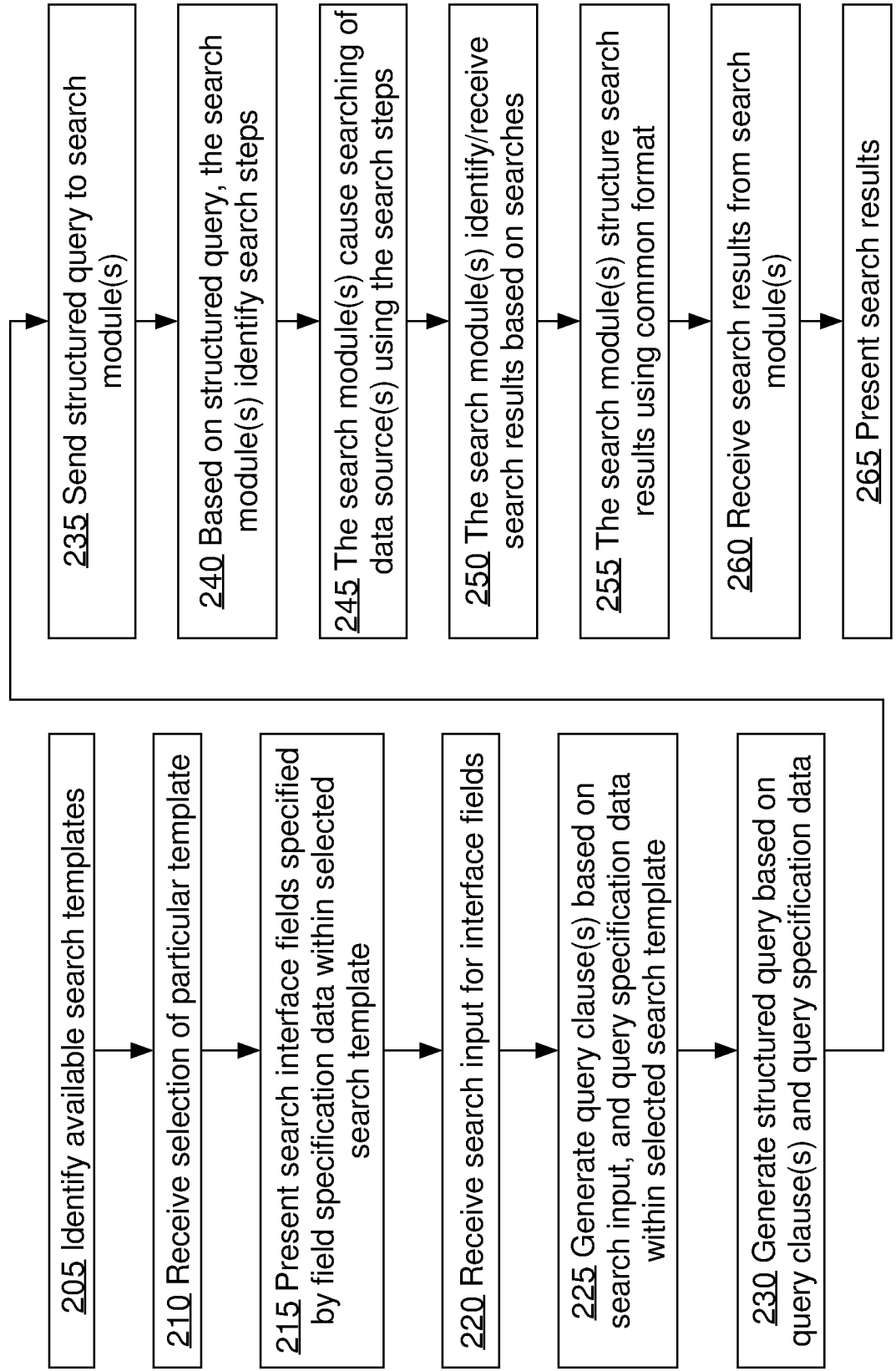
FIG. 2 illustrates a process flow for conducting a search.

FIG. 2 illustrates a process flow 200 for conducting a search. Flow 200 is but one example technique for conducting a search. Other flows may include fewer or additional elements in varying arrangements.

In an embodiment, each of the processes described in connection with the functional blocks of FIG. 2 may be implemented using one or more computer programs, other software elements, and/or digital logic in any of a general-purpose computer or a special-purpose computer, while performing data retrieval, transformation and storage operations that involve interacting with and transforming the physical state of memory of the computer. In one embodiment, flow 200 is performed by a computer system comprising, among other elements, a search client and a search server such as search client 110 and search server 120, as described in the previous section. For purposes of illustrating a clear example, the search server and search client may be described as separate and distinct components implemented by different computing devices; in other embodiments, the search server and search client may be components of a same application executing at the same computing device(s).

Block 205 comprises identifying a plurality of available search templates, for example, the search templates that have been described in the preceding sections. The identifying may comprise one or more of: accessing configuration data that specifies template locations, scanning for template files or other template structures, parsing template structures to locate template identifiers, checking user permission data with respect to the templates and/or the data sources accessed by the templates, and so forth. In an embodiment, block 205 may further comprise presenting controls to a user for selecting one of these identified search templates. However, performing such a step is not necessary in other embodiments.

Block 210 comprises receiving a selection of a particular search template from the plurality of search templates. The selection may be received via interface controls such as template selection controls 114, or the selection may be received programmatically via application logic. Receiving the selection may comprise one or more of: a search client directly receiving user input, a search server receiving an HTTP or other suitable web request, a search application receiving an API call, or a search client/server receiving any other suitable input.

Block 215 comprises, responsive to the selection of the particular search template, presenting search interface fields specified by field specification data within the selected search template, such as described in other sections. Block 215 may be performed, for instance, by creating a web page comprising a search form that includes field controls corresponding to the search interface fields, and then sending the web page to a web browser. As another example, block 215 may be performed by sending the field specification data to a standalone smartphone or desktop application that is configured to create graphical interface controls based thereon.

Block 220 comprises receiving search input for the search interface fields. The search input may comprise user-entered text and/or other user selected values, along with an indication of the search field(s) to which the input corresponds. Any suitable user input technique may be utilized in receiving the search input. Block 220 may comprise, for instance, a search client receiving input directly from a keyboard, mouse, and/or other suitable input device, and interpreting the intent of that input based on the depicted search field controls. Block 220 may further comprise, in some embodiments, a search server receiving a description of the search input from the search client.

Block 225 comprises generating one or more query clauses based on the search input, and further based on query specification data within the selected search template, as described in other sections. Block 225 may be performed, for instance, by a search client or a search server directly accessing the query specification data, and using the query specification data to determine how to generate the query clauses. In an embodiment, block 225 is performed at a search client by a query formulation component that was generated by the search server based on the query specification data in the selected search template.

The query specification data may specify, for instance, to generate keyword clause(s) based on search input corresponding to one or more keyword fields. The query specification data may further specify, for instance, to create comparison clause(s) based on search input for one or more fields associated with specific data structure properties. In an embodiment, the query specification data may specify to generate a clause that defines a relationship between a first input of the search input and a second input of the search input. The clause includes a search directive indicating the relationship. For example, the search directive may indicate that a search result must satisfy all of, at least one of, or only one of the search parameters corresponding to the first input and the second input. Or the search directive may indicate that a search result must satisfy the search parameters within a certain context, such as in adjacent or nearby terms within a same data structure property.

Block 225 may further comprise creating complex query clauses based on other query clauses, as described in other sections.

Block 230 comprises generating a structured query based on the generated query clauses and the query specification data. The structured query may be any data structure capable of describing all of the clauses, such as a JSON object.

Block 235 comprises sending the structured query to one or more search modules, such as the search adapters described in other sections and/or search engines. The search modules may be co-located with the search client and/or search server, or may be executed by one or more different computing devices. Block 235 may comprise a search client or search server sending the structured query directly to the one or more search modules. In an embodiment, block 235 may further comprise a search client sending the structured query to a search server so that the search server may send the structured query to the one or more search modules. In an embodiment, the same structured query is sent to a plurality of search modules. Block 235 may optionally comprise identifying the one or more search modules based on the selected template and/or based on data source selection input, such as described in other sections.

Block 240 comprises, based on the structured query, the one or more search modules identifying search steps to take with respect to one or more data sources. For a first type of search module, block 240 may comprise generating SQL statements, query execution plans, or other such steps that implement a process of directly searching a data repository for data structures that match the search parameters described in the structured query. For a second type of search module, whose data source(s) are search engines as opposed to other data repositories, block 240 comprises translating the structured query into a data source-specific query string or other message. The exact steps taken for a particular structured query may vary, including for search modules of the same type, depending on the data source to which a search module provides access. Both the first type of search module and the second type of search module may co-exist within certain embodiments.

Block 245 comprises the one or more search modules causing searches of the one or more data sources using the search steps. For the first type of search module, block 245 comprises actually executing the SQL statements, query execution plan, or other such steps. For the second type of search module, block 245 comprises sending the translated query to a search engine.

Block 250 comprises the one or more search modules identifying or receiving search results for the searches. The search results are, or describe, data structures within the searched data sources that match the search parameters defined by the clauses of the structured query. The first type of search module identifies the search results directly, while the second type of search module receives the search results from another search engine.

Block 255 comprises the one or more search modules structuring the search results using a common format expected by the search server and/or search client. Block 255 may be optional for some or all search modules, in that the search results received or identified by certain search modules may already be in the common format. In an embodiment, a search interface is configured to understand all possible search results that could be created by the one or more search modules, and thus block 255 is not needed even if the search results for different search modules are structured differently. Block 255 may also optionally comprise post-processing of search results.

Block 260 comprises the search server and/or search client receiving the search results from the one or more search modules. For example, block 260 may comprise the one or more search modules sending sets of search result data objects to the search server and/or the search client.

Block 265 comprises presenting the search results at the search client. For example, block 265 may comprise a search server generating HTML, JavaScript, or other suitable instructions for presenting the search results. The search server sends these instructions to a web browser at the client, which then presents the search results based thereon. As another example, block 265 may comprise the search client itself generating views of the search results returned by the one or more search adapters. For example, the search client may be an application that includes search result presentation logic. In an embodiment, block 265 comprises aggregating the search results together. However, in other embodiments, search results may be presented in separate sections. In an embodiment, block 265 is performed at least partially concurrent to blocks 250-260, in that searches may continue to run in the background as initial search results are published.

4.0. Example Search Interface

Figure 3:
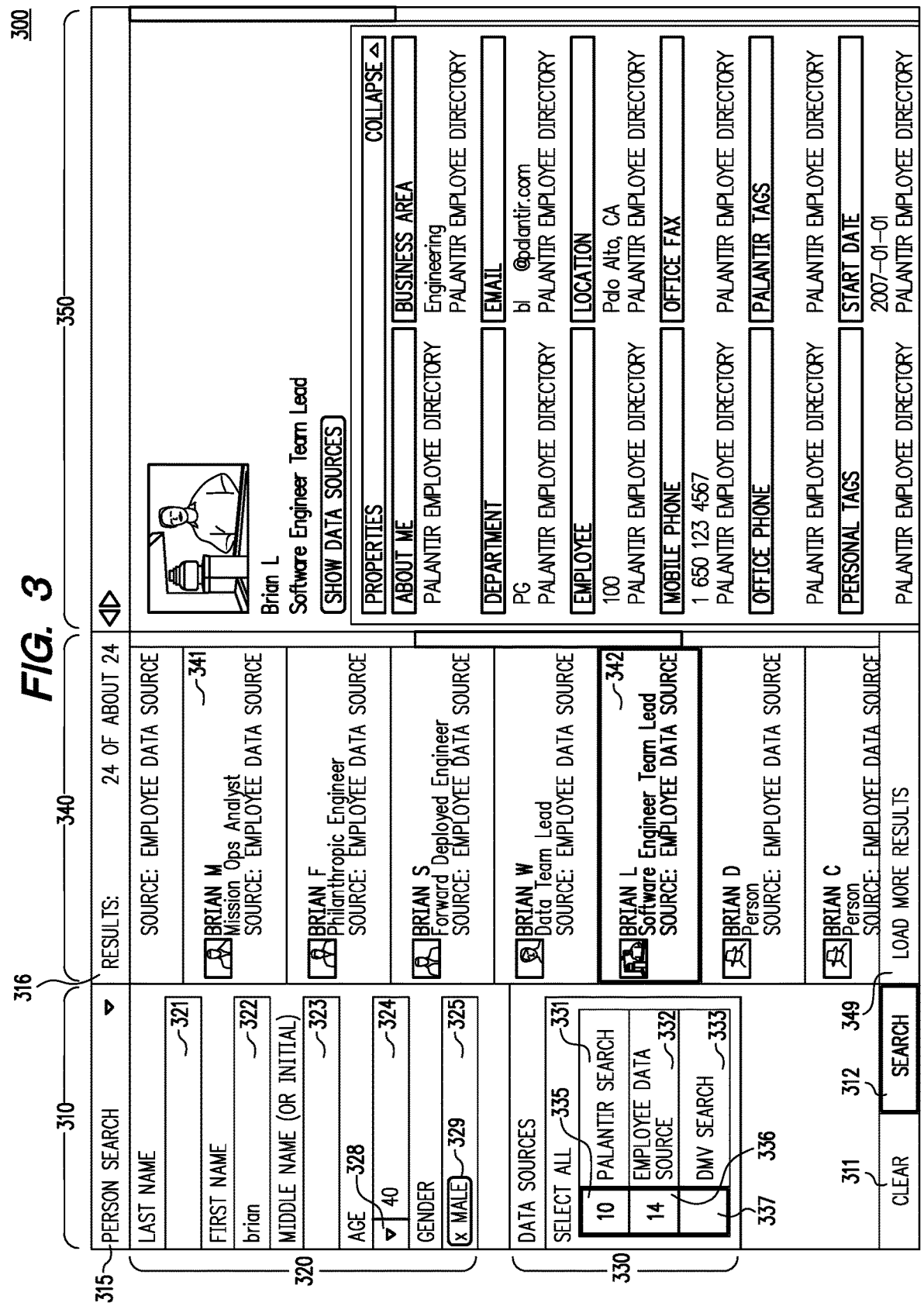
FIG. 3 illustrates an example template-based graphical user search interface.

FIG. 3 illustrates an example template-based graphical user search interface 300, according to an embodiment. Search interface 300 is one example of a search interface that may be generated using the techniques described herein and in other embodiments, search interfaces may comprise fewer or additional elements, in potentially varying arrangements.

Search interface 300 comprises a search form 310, including a template selector 315, search field area 320, and data source selection area 330. Template selector 315 names the current search template, and allows users to select a new template from a list of templates by selecting the pull-down menu control 316. Selecting a new template may result in changes to search field area 320 and data source selection area 330, depending on the search fields and/or data sources specified by the new template.

Search field area 320 comprises search field controls 321-325, each of which corresponds to a different search field identified by the currently selected template. Each of controls 321-325 includes a label to provide information to a user concerning the search field to which the respective control 321-325 corresponds. A user may specify input for a search field by entering input via a corresponding search field control 321-325. Controls 321-323 are text boxes. In some embodiments, typing into these text boxes may bring up a list of suggestions, derived from previous input associated with the template, previous input associated with similar search fields in other templates, and/or existing data within the data structure properties with which the corresponding property is to be compared. A search server or search client may be configured to automatically track such data and generate such suggestions without the suggestions having been specified in the selected template.

Control 324 may comprise a textbox that features a comparison operator selector 328. Comparison operator selector 328 is a pull-down menu that allows a user to select between comparison operators in order to specify how the inputted value of control 324 is to be compared to the values of the data structure property to which the corresponding search field is to be compared. Control 325 is a multi-value selector. Users may select multiple values by typing the values directly and/or using a pull-down menu populated with a list of values. Each selected value will be depicted with a selected value indicator 329.

Data source selection area 330 comprises data source filter controls 331-333. Each data source filter control 331-333 corresponds to a different data source specified by the selected template, as indicated by the labels in filter controls 331-333. A user may tap or click on a control 331-333 to toggle between selecting the corresponding data source and unselecting the corresponding data source. In an embodiment, a search is only submitted for selected data sources. In another embodiment, a search is submitted for all data sources, but only search results for selected data sources are shown.

Each control 331-333 includes a status indicator 335-337 that indicates, by color or other suitable indication, whether the corresponding control 331-333 is currently selected. If a search has already been submitted, status indicators 335-337 may furthermore provide information about the data sources with respect to the search. For example, status indicators 335-337 may turn a different color or show a special graphical indicator while search results are being retrieved from a data source. Also, as depicted, status indicators 335-337 may provide an indication of a number of search results returned from a corresponding data source, and/or an indication of the quality thereof.

Search form 310 further comprises a clear control 311. User selection of clear control 311 resets all controls 321-325 and 331-333 to their default input values. Search form 310 further comprises a submit control 312. User selection of submit control 312 indicates to search interface 300 that the user has finished specifying search parameters, and wishes to retrieve search results. Both controls 311-312 are optional, depending on the environment. For example, in some embodiments, selection of a data source selection control 331-333 indicates to the search interface that the search should be sent to the corresponding data source. In other embodiments, a search is sent any time the user provides input into search form 310. Thus, for instance, the user may perceive search interface 300 as returning search results while the user is still typing in a text box 321-333.

Search interface 300 further comprises a search result area 340. Search result area 340 is a scrollable list of search results, including search results 341 and 342. Search result area 340 is initially blank, but then filled with views of search results after a search has been performed. Each search result is presented as a rectangular area within the scrollable list, and may include summary information about the data structure corresponding to the search result, such as a thumbnail, name, description, and/or other selected information. The exact information presented for each search result may vary depending on the type and/or contents of the data structure to which a search result corresponds.

In some embodiments, sets of search results are retrieved iteratively from each data source. For example, a search adapter may be configured to return a first set of high-quality or easy-to-locate search results before returning other search results. If necessary, the search adapter may continue to search for additional results even after returning the first set. In an embodiment, search result area 340 is updated to include these additional results as found. In another embodiment, the search interface must explicitly request that the search adapter continue searching and/or return the additional results. Thus, as depicted in FIG. 3, search result area 340 further includes a control 349 for retrieving additional results. The process may be repeated for any number of iterations.

Search interface 300 further includes an optional detail view area 350 that displays more information about a selected search result 342. Depending on the embodiment, the detail view area 350 may include additional information from the data structure corresponding to search result 342, including information not initially returned with the search results. For example, clicking on 342 may cause a search interface generator to perform one or more queries with respect to the corresponding data structure in order to populate a detail view template for the data structure.

In some embodiments, search results 341-342 and/or detail view area 350 may further include controls for performing actions with respect to a corresponding data structure, such as viewing or editing the complete data structure, printing the detail view, generating a data visualization based on the corresponding data structure, and so forth. Also, multiple search results may be selected from search result area 340, and one or more controls may allow for one or more actions with respect to these multiple search results. Search interface 300 may further include additional views derived from the search results, such as maps or graphs.

5.0. Example Data Structures 5.1. Example Template

According to an embodiment, a template is a data object, such as a JSON object, comprising: a URI field specifying a private identifier for the template; a name field specifying the name of the template, as seen by a user; an optional description field comprising additional information about the template; multiple field objects; an optional query object; and an optional data source object. A field object, in turn, comprises: a URI specifying a private identifier for the field; an input type, which specifies the type of input control used to collect input for the field object; a name, corresponding to the name displayed in the label for the input control; an optional default value; an optional data type; and/or an optional comparison operator. A data source object comprises a list of data sources and/or search adapters targeted by the template.

A query object comprises one or more clause objects. Example clause object types include, without limitation: an AND clause for specifying a conjunction between two or more other clauses, an OR clause for specifying a disjunction between two or more other clauses, an ObjectType clause for specifying a type of object to filter the search upon, a Keyword clause for specifying one or more keywords to filter the search upon, or a Property clause for specifying comparison operations between an input value and a particular data structure property. Each of the ObjectType, Keyword, and Property clauses includes a data field that specifies either the URI of a field object from which to retrieve input, or hard-coded data for "hidden" search parameters.

TABLE 1 illustrates an example template for generating the search interface 300 of FIG. 3, in accordance with the above-described embodiment

TABLE 1

EXAMPLE TEMPLATE

{
  "uri":"pt.template.person",
  "name": "Person Search",
  "fields": [
    {
      "uri":"LastName",
      "display":"Last Name",
      "inputType":"property",
      "data": {
        "typeUri":"com.palantir.property.Name",
        "componentUri":"LAST_NAME",
        "operator": "=", TABLE 1-continued

EXAMPLE TEMPLATE

```
      }
    },
    {
      "uri":"FirstName",
      "display":"First Name",
      "inputType":"property",
      "data": {
         "typeUri":"com.palantir.property.Name",
         "componentUri":"FIRST_NAME",
         "operator": "=",
      }
    },
    {
      "uri":"MiddleName",
      "display":"Middle Name (or Initial)",
      "inputType":"property",
      "data": {
         "typeUri":"com.palantir.property.Name",
         "componentUri":"MIDDLE_NAME",
         "operator": "=",
      }
    },
    {
      "uri":"age",
      "display":"Age",
      "inputType":"property",
      "data": {
         "typeUri":"com.palantir.property.Age",
      }
    },
    {
      "uri":"Gender",
      "display":"Gender",
      "inputType":"property",
      "data": {
         "typeUri":"com.palantir.property.Gender",
         "operator": "=",
      }
    },
  ],
  "query":{
    "type":"AND",
    "clauses":[
      {
        "type":"Property",
        "value-uri":"LastName"
      },
      {
        "type":"Property",
        "value-uri":"FirstName"
      },
      {
        "type":"Property",
        "value-uri":"MiddleName"
      },
      {
        "type":"Property",
        "value-uri":"age"
      },
      {
        "type":"Property",
        "value-uri":"Gender"
      },
      {
        "type": "OR",
        "clauses": [
          {
            "type":"ObjectType",
            "data": {
              "value":"com.palantir.object.Person"
            }
          },
          {
            "type":"ObjectType",
            "data": {
              "value":"com.palantir.object.Entity"
            }
          },
```

TABLE 1-continued

EXAMPLE TEMPLATE

```
        ]
      },
    ]
  },
  "dataSources": [
    "pt.data.palantir.structured",
    "pt.data.people",
    "pt.data.test3",
  ]
}
```

The above template specification is given by way of example. In other embodiments, templates may be structured in any number of suitable manners.

5.2. Example Structured Query

According to an embodiment, TABLE 2 illustrates an example structured query generated based on the above example template:

TABLE 2

EXAMPLE STRUCTURED QUERY

```
{
  "type":"AND",
  "clauses": [
    {
      "value-uri":"LastName",
      "data": {
        "componentUri":"LAST_NAME",
        "typeUri":"com.palantir.property.Name",
        "value":"",
        "operator":"="
      },
      "userEntered":true,
      "type":"Property"
    },
    {
      "value-uri":"FirstName",
      "data": {
        "componentUri":"FIRST_NAME",
        "typeUri":"com.palantir.property.Name",
        "value":"brian",
        "operator":"="
      },
      "userEntered":true,
      "type":"Property"
    },
    {
      "value-uri":"MiddleName",
      "data": {
        "componentUri":"MIDDLE_NAME",
        "typeUri":"com.palantir.property.Name",
        "value":"",
        "operator":"="
      },
      "userEntered":true,
      "type":"Property"
    },
    {
      "value-uri":"age",
      "data": {
        "typeUri":"com.palantir.property.Age",
        "value":"40",
        "operator":"<"
      },
      "userEntered":true,
      "type":"Property"
    },
    { "value-uri":"Gender",
      "data": { "typeUri":"com.palantir.property.Gender",
        "value":["","MALE"],
        "operator":"="
      },
      "userEntered":true,
```

TABLE 2-continued

EXAMPLE STRUCTURED QUERY

```
    "type":"Property"
   },
   {
    "type":"OR",
    "clauses": [
      {
       "data": {
         "value":"com.palantir.object.Person"
       },
       "type":"ObjectType"
      },
      {
       "data": {
         "value":"com.palantir.object.Entity"
       },
       "type":"ObjectType"
      }
    ]
   }
  ]
}
```

The above structured query definition is given by way of example. In other embodiments, queries may be structured in any number of suitable manners.

5.3. Example Search Result

TABLE 3 illustrates an example search result returned from a search adapter:

TABLE 3

EXAMPLE SEARCH RESULT

```
{
    "id": "pt.data.palantir.structured:887340230857982198",
    "simpleId": "887340230857982198",
    "title": "Brian D",
    "hasThumbnail": true,
    "description": "Person",
    "dsName": "Palantir Search",
    "dsUri": "pt.data.palantir.structured"
}
```

The example search result is used in an embodiment where generating a presentation of the search result comprises looking up additional information about the data structure referenced by the search result. In other embodiments, search results may be structured in any number of suitable manners. For example, a search result may include all information necessary to generate a presentation for the search result, such as a title, description, thumbnail link, and so forth.

6.0. Example Extensibility Features

In embodiments, new templates and/or search adapters may be made available to a search server and search client via a registration process at the search server. For example, each template and/or search adapter may be contained in a separate file. In an embodiment, the template and/or search adapter may be registered by placing the file within a certain directory on the search server. In other embodiments, the template and/or search adapter may be registered by adding the location of the file to a path statement in a configuration file that specifies templates. The search server may access this configuration file or directory to identify which templates and/or search adapters are available.

In an embodiment, each search adapter implements the same API. For example, each search adapter may be based on a coded object that inherits features and functions from a common coded object. In an embodiment, each search adapter implements a common set of API function calls, including some or all of: a function call for retrieving identifier(s) of data source(s) to which the search adapters provide access, a function call for receiving a structured query, a function call for converting the structured query API into a string-based query that conforms with the data source (s), a function for initiating a search, a function for returning a complete set of search results, or a function for returning an iterative set of search results.

7.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
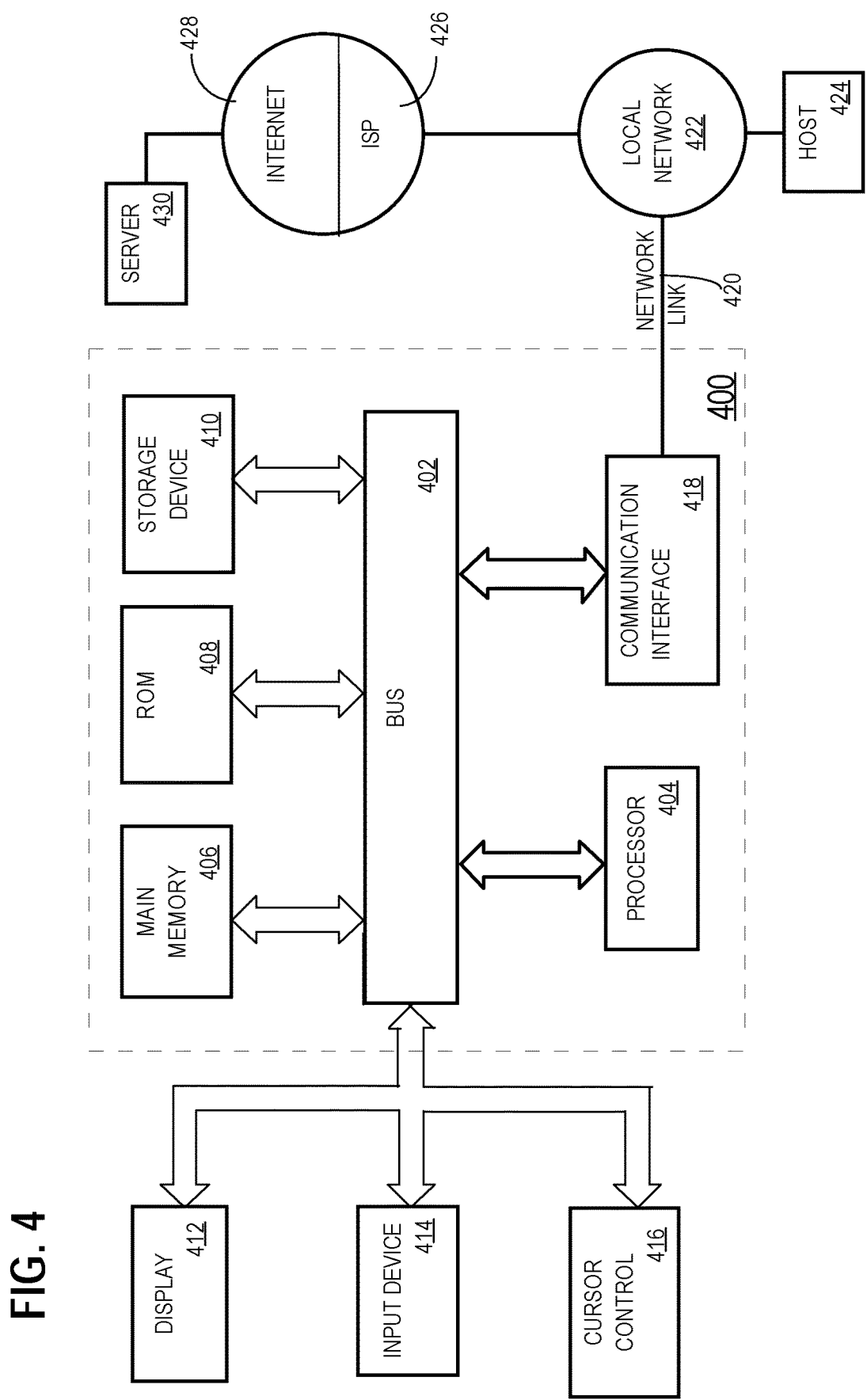
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

One or more forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing one or more types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the one or more networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors configured to:
receive, from a client, a selection of a particular template of a plurality of templates, the particular template comprising a plurality of properties;
create a form that comprises a control and a field, the control for selecting a particular property of the plurality of properties of the particular template, and the field for receiving a corresponding particular input to be compared against values corresponding to the particular property, the values in one or more data structures of one or more data sources; and
send the form to the client.

2. The system of claim 1, wherein the particular template further specifies a comparison operation between the corresponding particular input and the values corresponding to the particular property in the one or more data structures or metadata for the one or more data structures to be searched in the one or more data sources.

3. The system of claim 2, wherein the particular template further comprises query specification data, and wherein the one or more processors are configured to use the query specification data to generate a structured query comprising a first clause that specifies how the corresponding particular input is compared to the one or more data structures when conducting a search.

4. The system of claim 3, wherein the one or more processors are configured to translate the structured query into respective data source-specific query strings for the one or more data sources.

5. The system of claim 3, wherein the structured query further comprises: a particular search filter with a required value and/or data structure type indicated by the query specification data, wherein a hidden field from the form specifies the particular search filter.

6. The system of claim 1, wherein:
said field is a first field;
the one or more processors are further configured to create the form that comprises the first field and a second field;
wherein the particular template further specifies how search input received via the first field and the second field is compared to the one or more data structures in the one or more data sources.

7. The system of claim 6, wherein the particular template further comprises query specification data, and wherein the one or more processors are configured to use the query specification data to generate a structured query comprising:
a first clause based on a first input from the first field;
a second clause based on a second input from the second field; and
a logical operator that specifies a relationship between the first clause and the second clause.

8. A system comprising:
one or more processors configured to execute a search application, the search application configured to:
select a template of a plurality of templates, each template comprising a plurality of properties;
send an indication of a selected template to a server;
receive, from the server in response to sending the indication of the selected template to the server, a form, the form comprising a field for receiving a corresponding particular input and a control for selecting a particular property of the plurality of properties to which the corresponding particular input is to be compared;
generate a query comprising a selected particular property of the plurality of properties and the corresponding particular input which is to be compared against values corresponding to the selected particular property, the values in one or more data structures of one or more data sources; and
communicate the query to one or more search adapters to execute the query on the values in one or more data structures of one or more data sources.

9. The system of claim 8, wherein the selected template further specifies a comparison operation between the corresponding particular input and the values corresponding to the particular property in the one or more data structures or metadata for the one or more data structures to be searched in the one or more data sources.

10. The system of claim 9, wherein the selected template further comprises query specification data, wherein the search application is configured to use the query specification data to generate the query comprising a first clause that specifies how the corresponding particular input is compared to the values in the one or more data structures when conducting a search.

11. The system of claim 10, further comprising the one or more processors configured to execute the one or more search adapters, which are configured to translate the query into respective data source-specific query strings for the one or more data sources.

12. The system of claim 10, wherein the query further comprises: a particular search filter with a required value and/or data structure indicated by the query specification data, wherein a field hidden from the form specifies the particular search filter.

13. The system of claim 8, wherein:
said field is a first field;
the search application is further configured receive and to present the form comprising the first field and a second field;
wherein the selected template further specifies how search input received via the first field and the second field is compared to the one or more data structures in the one or more data sources.

14. The system of claim 13, wherein the selected template further comprises query specification data, and wherein the search application is configured to use the query specification data to generate the query comprising:
a first clause based on a first input from the first field;
a second clause based on a second input from the second field; and
a logical operator that specifies a relationship between the first clause and the second clause.

15. A method comprising:
receiving, from a client at a server, a selection of a particular template of a plurality of templates, the particular template comprising a plurality of properties;
creating, at the server, a form that includes a field and a control, the control for selecting a particular property of the plurality of properties of the particular template, and the field for receiving a corresponding particular input to be compared against values corresponding to the particular property, the values in one or more data structures of one or more data sources;
sending, from the server to the client, the form;
wherein the method is performed using one or more processors.

16. The method of claim 15, wherein the particular template further specifies a comparison operation between the corresponding particular input and the values corresponding to the particular property in the one or more data structures or metadata for the one or more data structures to be searched in the one or more data sources.

17. The method of claim 16, wherein the particular template further comprises query specification data used to generate a structured query comprising a first clause that specifies how the corresponding particular input is compared to the one or more data structures when conducting a search.

18. The method of claim 17, further comprising:
translating the structured query into respective data source-specific query strings for the one or more data sources.

19. The method of claim 17, wherein the structured query further comprises: a particular search filter with a required value and/or data structure type indicated by the query specification data, wherein a hidden field from the form specifies the particular search filter.

20. The method of claim 15, wherein:
said field is a first field;
the form includes a second field;
the particular template further specifies a logical operator; and
wherein the method further comprises, generating a structured query comprising:
a first clause based on a first input from the first field;
a second clause based on a second input from the second field; and the logical operator that specifies a relationship between the first clause and the second clause.

\* \* \* \* \*